(12) United States Patent
Harkless et al.

(10) Patent No.: US 6,356,649 B2
(45) Date of Patent: *Mar. 12, 2002

(54) "SYSTEMS AND METHODS WITH IDENTITY VERIFICATION BY STREAMLINED COMPARISON AND INTERPRETATION OF FINGERPRINTS AND THE LIKE"

(75) Inventors: Curt R. Harkless, Canoga Park; Randall E. Potter, North Hills; John A. Monro, Jr., Alhambra; Lawrence R. Thebaud, Agoura Hills, all of CA (US)

(73) Assignee: Arete Associate, Inc., Sherman Oaks, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/843,219

(22) Filed: Apr. 11, 1997

(51) Int. Cl.[7] .................................................. G06K 9/00
(52) U.S. Cl. ..................... 382/115; 382/116; 382/191; 382/254; 382/275; 356/71
(58) Field of Search ................................. 382/115, 116, 382/124, 125, 190, 191, 201, 206, 209, 254, 260, 275; 356/71; 340/825.34; 250/208.1, 216

(56) References Cited

U.S. PATENT DOCUMENTS 3,112,468 A * 11/1963 Kamentsky ................. 382/125
5,859,420 A * 1/1999 Borza ....................... 250/208.1
5,909,501 A * 6/1999 Thebaud ..................... 382/124
5,963,657 A * 10/1999 Bowker et al. ............. 382/127

* cited by examiner

Primary Examiner—Matthew C. Bella
Assistant Examiner—Sheela Chawan
(74) Attorney, Agent, or Firm—Smart & Biggar

(57) ABSTRACT

Preferably a sensor receives a print image from an authorized person to form a template, and from a candidate to form test data. Power spectral density (PSD) data for the template and candidate are compared, to read out rotation & dilation; these are used to adjust the template or candidate preparatory to a correlation to find translation. After applying the translation, and refinement of the rotation and dilation, normalized spatial correlation values (NSCVs) are used as a measure of quality of the match—and thresholded to make an early rejection or acceptance decision in very clear cases. Where the question is closer, isomorphic adjustment is applied to the entire template or candidate for a fairer comparison in their overlap area. Such comparison proceeds by the same type of PSD analysis—but for multiple subregions in the overlap area. Resulting NSCVs are averaged to obtain a measure of quality of the match, which again is thresholded for a final decision in the closer cases. Noise variance from the test data, vs. position in the image, is used to weight the importance of comparison with the template in each subregion. Nonvolatile memory holds instructions for automatic operation.

22 Claims, 8 Drawing Sheets

Histogram of Data

A B C

"SYSTEMS AND METHODS WITH IDENTITY VERIFICATION BY STREAMLINED COMPARISON AND INTERPRETATION OF FINGERPRINTS AND THE LIKE"

RELATED U.S. PATENT DOCUMENTS

A closely related coowned, application is Ser. No. 08/709,302 of Lawrence R. Thebaud, filed Sep. 9, 1996, and issued Jun. 1, 1999, as U.S. Pat. No. 5,909,501. Two other coowned, applications are related: Ser. No. 08/382,220 of J. Kent Bowker and Stephen C. Lubard, Ph. D., filed Jan. 31, 1995, and issued Sep. 22, 1998, as U.S. Pat. No. 5,812,252; and Ser. No. 08/709,785 of J. Kent Bowker et al., filed Sep. 9, 1996, and issued Oct. 5, 1999, as U.S. Pat. No. 5,963,657. All three applications are wholly incorporated by reference into the present document.

FIELD OF THE INVENTION

This invention relates generally to systems and methods for verifying identity of people, by comparison and interpretation of skin patterns such as fingerprints; and more particularly to novel firmware and software stored in apparatus memories, as portions of apparatus, for interpreting such patterns and controlling utilization devices. With respect to certain of the appended claims, the invention further relates to systems that include such utilization devices.

A utilization device is, for example, a facility, apparatus, means for providing a financial service, or means for providing information. The phrase "utilization device" thus encompasses, but is not limited to, businesses, homes, vehicles, automatic teller machines, time-and-attendance systems, database-searching services, and a great many other practical systems. An apparatus memory for such storage is, for example, a programmable read-only memory ("PROM"), or a computer-readable disc.

BACKGROUND OF THE INVENTION

Classical methods for evaluation of fingerprints. toeprints, palmprints and like skin patterns entail location, categorization and tabulation of minutiae. Efforts to adapt these classical techniques for automated print verification have received great attention and elaboration, but are fundamentally limited by their sensitivity to measurement noise at the location of the minutiae.

Automated analysis based on minutiae also is inherently very dependent on image enhancement—which often breaks down when initial data quality is marginal. For these reasons some workers have explored other methodologies.

Some seemingly promising efforts employ holograms—either direct three-dimensional images of prints, or holographic Fourier transforms (which have the advantage of being position invariant). Some of these techniques, for best results, impose costly demands on special memory devices for storing the holograms. These holographic correlators are in essence modern refinements of much earlier two-dimensional direct-optical-overlay correlators such as that described by Green and Halasz in U.S. Pat. No. 3,928,842.

An intermediate ground is represented by a few relatively sophisticated patents that use digital computers to (1) automatically select one or more distinctive small regions—not necessarily minutiae—in a master print or "template", and then (2) automatically look for one or more of these selected small regions in a print provided by a person who purports to be the maker of the template. These earlier patents particularly include U.S. Pat. No. 5,067,162 of Driscoll, U.S. Pat. No. 5,040,223 of Kamiya, U.S. Pat. No. 4,982,439 of Castelaz, U.S. Pat. No. 4,805,223 of Denyer, and U.S. Pat. No. 4,803,734 of Onishi.

All of these latter patents describe making final verification decisions based upon such comparisons of small regions exclusively—although in some cases a small number of such regions are considered concurrently. We have confirmed that many fingerprints can be analyzed very quickly and accurately using just one or two regions, but we have also found that provision must be made for a significant number of prints in which such short-form efforts are indeterminate or at least not adequately reliable.

Thus the patents listed just above are flawed in their ultimate dependence upon isolated, small amounts of data—more specifically, very small fractions of the available information in a candidate user's print—for all fingerprints, regardless of the character of the print. The above-mentioned related patent document of Thebaud, on the other hand, takes into account essentially all the available information in a candidate print.

Thebaud's system does so for all prints. We have recognized that for some types of systems this thoroughness and the accompanying time consumption can represent a significant drawback, because—in a large majority of cases—small regions contain sufficiently distinctive information for a reliable analysis.

Some of the patents in the above list do describe sound techniques for one or another part of their respective processes. Some workers, such as Driscoll and Kamiya, use correlation methods (but electronic-data correlation methods, not optical correlation methods) to choose the small reference sections in the enrollment process—i.e., in forming the template—and also in comparison of those regions with features in a candidate user's print. Denyer similarly uses an approximation to such correlation technique.

These patents do generally allow for the possibility that the authorized user's template may be shifted, or in other words translated, in placement of the print image on the sensor. Some (particularly Driscoll and Denyer) allow for the possibility that the template may be rotated too.

Driscoll discusses finding a least-squares-fit between plural reference regions and a potentially corresponding plurality of test regions in the candidate print. He suggests that departures from an ideal rotated pattern of the reference regions is to be accounted for by distortion of the fingertip in the course of placement on a sensor, but by his reliance on a very small number (typically three, as understood) of well-separated reference regions his allowance for distortion— and his overall verification decision as well— inherently make use of only a very small fraction of the available information. Denyer, too, briefly mentions (though in a much more generalized and tangential way) the possibility of somehow accounting for distortion.

All of these patent documents except Thebaud's, however, fail to take account of dilations which an authorized user's fingertip may undergo—relative to the same user's established template. (By the term "dilations" we mean to encompass dilations or contractions as the case may be.) Such dilations may arise from variations in the pressure with which the finger is applied to an optical or other sensor (capacitive, variable-resistance etc.).

Such dilations may be expected to have at least a component which is invariant across the entire image, in other words a dilation without change of fingerprint shape—an isomorphic dilation. Furthermore all the above-mentioned patents fail to make systematic, controlled allowance for dilations and other forms of distortion that are differential—which is to say, nonisomorphic.

Correlation methods, matched-filter methods, and (loosely speaking) related overlay-style techniques of comparison all fail totally in any area where a reference print is mismatched to a candidate print by as little as a quarter of the spacing between ridges. It has been found that dilations and other distortions can and commonly do produce spurious mismatches locally—over sizable areas—exceeding twice the spacing between ridges, that is, many times the minimum disruption which destroys correlation and thereby recognition.

Therefore, failure to account properly for either dilation (isomorphic distortion) or distortion (differential distortion) results in unacceptably high rates of failure to verify or recognize an authorized user—i.e., high rates of the so-called "false rejection" or "type 1 error". Artificial measures aimed at reducing this failure rate lead inevitably to the converse: unacceptably high rates of failure to reject unauthorized users, impostors—i.e., high rates of the so-called "false acceptance" or "type 2 error".

For those few cases in which abbreviated analysis is unreliable, it appears unlikely that adequate account of distortions can be made merely by allowing for random variation as between two or three cores or distinctive regions. The full-coverage paradigm of the Thebaud document, by virtue of its ability to use all information available in the entire area of overlap between the reference and test images, has an immunity to such error, but at the cost of a relatively long analysis time—currently several seconds (after the fingerprint data are fully acquired) per determination—even for prints which have very distinctive regions.

Similarly none of the prior-art patents noted makes use of decisional downweighting of data from areas that are less certain or noisier; rather, to the extent that any consideration at all is given to such matters, noisy data are simply discarded—a very undesirable way to treat expensive data. Bandpassing of test data is not seen in these references, although certain other forms of filtering are used by Driscoll and others. Normalizing is likewise absent—except for trivial forms implicit in binarization or trinarization, used in many print analyzers. None of the noted patents teaches expression of test and template data, or comparison of such data with one another, in terms of local sinusoids.

Another problem which the art has not adequately addressed heretofore is that of image-data coverage and quality. It is common in commercial devices in this field to find that images are acquired and accepted for analysis based only upon occluding of the acquisition port by a finger or some other object—i.e., the presence of something at the acquisition port—without regard for the usability or reliability of the image, or indeed even whether it is an image of a fingerprint or other skin pattern.

Still another difficulty is that analysis systems are not necessarily attuned to the peculiarities of the skin-pattern data encountered. When analysis proceeds on assumptions (for example, the size of the fingerprint-ridge spacing) that are not applicable to the actual specimen presented, reliability of the results is impaired.

Another challenge not adequately met heretofore is that fingerprint acquisition systems labor under severely adverse conditions of low skin-pattern contrast and high variation in lighting across the pattern—so that a relatively high dynamic range in light intensities is present—but yet the cost, time consumption and in some cases sheer space and bulk required to store or transmit the resultant, correspondingly high-dynamic-range signal data.

A very closely related problem is that attempts to reduce the required cost, time consumption and space or bulk associated with data storage and transmission run into a contrary requirement that the data must be fairly comparable to original data. It must not have anomalous characteristics that can be associated with, for example, commonplace data-compression techniques. A particularly knotty problem is the need for smoothness along ridges, lest the analysis system be unable to recognize their essentially continuous character.

Thus the skin-pattern verification field has failed to—in a time-effective manner—make good use of all available data, take adequate account of dilations or distortions, make suitable allowance for known statistics of placement variation, and apply modern decisional and signal-processing tools. As can now be seen, prior art in this field remains subject to significant problems, and the efforts outlined above—while praiseworthy—have left room for considerable improvement.

SUMMARY OF THE DISCLOSURE

The present invention introduces such improvement, and performs fingerprint verifications in a remarkably short time and with an outstandingly high accuracy not available heretofore. The invention has several facets or aspects which are usable independently—although for greatest enjoyment of their benefits we prefer to use them together, and although they do have some elements in common.

Common parts will be described first. In preferred embodiments of the first three independent facets which will be discussed below, the invention is apparatus for acquiring personal skin-pattern print data for use in comparison to verify the identity of a person.

In preferred apparatus embodiments of the next seven independent facets to be discussed (i.e., the fourth through tenth aspects), the present invention is apparatus for verifying the identity of a person. It operates by comparing (1) test data representing a two-dimensional test image of that person's skin-pattern print with (2) reference data derived from a two-dimensional reference skin-pattern print image obtained during a prior enrollment procedure.

Certain additional aspects or facets of the invention will be described following the first ten. Each of the apparatus embodiments includes some means for holding instructions for automatic operation of the other elements of the apparatus; these instruction-holding means include or make use of a nonvolatile memory device, and may be termed the "nonvolatile memory means".

Now in preferred embodiments of a first of its independent aspects, the apparatus includes some means for physically receiving contact by the skin of such a person and for, during that contact, forming an optical image of the skin pattern. For purposes of breadth and generality in discussion of the invention we shall refer to these means simply as the "optical means".

In addition the apparatus includes some means for receiving the optical image from the optical means—and generating in response a series of electronic signal arrays derived from such pattern during the contact. Again for generality and breadth we shall call these the "optoelectronic means".

In addition the apparatus includes some means, the "electronic means", for monitoring the series of electronic signal arrays during the contact; and some means, the "saving means", for saving at least one of said electronic signal arrays for use in such comparison. Also in the apparatus are some means for deferring operation of the saving means until at least one of the electronic signal arrays in the series satisfies a particular condition related to a characteristic of the pattern; these last "deferring means" are responsive to the electronic monitoring means during the contact.

The foregoing may represent a definition or description of the first aspect of the invention in its broadest or most general form; however, even in this form this facet of the invention can be seen to importantly advance the art of fingerprint acquisition and analysis. In particular the system is more reliable than heretofore, in that an image is accepted for analysis only if its quality (and as will be seen its areal coverage) are adequate for analysis.

Nevertheless we prefer to practice the first aspect of the invention—and others mentioned below as well—with certain further features and characteristics that enhance enjoyment of the benefits of the invention. Accordingly we prefer, for example, that the "particular condition" mentioned above includes a test for adequacy of skin-pattern image area, based not merely upon occlusion of the optical data port but actually upon spatial-frequency content of the electronic signal arrays.

That is to say, the signals should contain energy at spatial frequencies characteristic of skin-pattern prints, even when our invention is simply testing for areal coverage. A like more but stringent criterion is applied when the system is at a more advanced stage of testing for quality of the print.

Furthermore we have found that details of a skin contact settle during contact, and the electronic signal arrays in the series tend to improve as said skin contact settles. We accordingly prefer to collect sequential images over an extended period of time when necessary, halting the process only if and when an image is acquired that passes usability criteria.

Numerous other preferences will appear in regard to this first aspect (and the others as well) of the invention, in the "DETAILED DESCRIPTION" section that follows.

In preferred embodiments of a second main facet or aspect of the invention, the apparatus includes some means for receiving or generating an electronic signal array corresponding to the skin pattern—these will be called the "receiving or generating means"—and also some means for defining a plurality of signal wavenumber bands.

Included moreover are some means—the "comparing means"—for comparing wavenumber content of the electronic signal array with the plurality of defined wavenumber bands. Further the system includes some means for selecting a particular one band of said plurality to use in analyzing said electronic signal array to verify the identity of such person; these selecting means are responsive to the comparing means.

Even as defined thus broadly, a system in accordance with this second aspect of our invention operates in a signal spatial waveband that is specifically chosen to match the data encountered. Reliability of the resulting analysis is accordingly enhanced.

In preferred embodiments of the third main aspect of the invention, the apparatus include some means for receiving or generating a multilevel electronic signal array corresponding to such skin pattern. It also includes some means for preliminarily evaluating or preprocessing, or both, the multilevel electronic signal array.

By "multilevel" we mean that the dynamic range of the signal is at least four binary bits—i.e., a factor of sixteen times the smallest signal shift which the system can comprehend—and preferably five bits or more. Our present preferred embodiment is an eight-bit system, though this is primarily a matter of economically available components.

In addition the apparatus includes some means for expressing the preliminarily evaluated or preprocessed, or both, signal array in two- or one-bit form. It also includes means for storing or exporting the signal array expressed in said two- or one-bit form.

The foregoing may provide a definition or description of the third aspect of the invention in its most general or broad form, but even as thus broadly couched the third aspect of the invention significantly advances the art. In particular, preferred embodiments according to this third facet of the invention can now be seen to provide a full dynamic range for the signal, to allow for lighting variations—and other variables such as whether the skin-pattern contrast is high or low. At the same time this aspect of the invention does not compromise as to the time, space or cost of storage or data-export capacity.

As mentioned earlier, several preferences are applicable to even still further enhance the benefits of this third aspect of the invention.

As to the fourth main aspect of the invention, the apparatus includes some means for extracting reference data from storage or from an imported data set for use in verification. The apparatus also includes preprocessing means for bandpassing, normalizing and smoothing the extracted data for use in verification.

Further included are some means for comparing the data from the preprocessing means with the test data to verify identity. The foregoing presentation may represent the fourth facet of the invention in its most broad and general manifestation, but even so it does meaningfully promote the art, particularly in that economically and quickly exported or stored data with only one or two bits (in accordance with the third aspect of the invention) is readily and economically rendered completely adequate for use in analysis.

Turning to a fifth major facet of the invention, the apparatus includes some means for deriving from reference data or test data, or both, a respective form of a vector gradient field. The apparatus also includes some means for smoothing such reference or test data, or both, under control of the vector-gradient-field form so that the smoothing is substantially along the directions of respective ridges of the skin pattern. In addition the apparatus includes some means for applying the smoothed data in making an identity-verification decision.

In this way data quality needed for entirely reliable analysis is simply reconstituted, when stored or transmitted image information is readied for use. No compromise need be struck between storage/transmission economies and reliability of verification.

This broadest form of the fifth facet of the invention, too, is subject to additional preferences. For instance we prefer to find a vector gradient field from a fast Fourier transform of the data, screening the vector gradient field to account for phase jumps.

In addition, merely as a matter of practicalities we currently prefer that the form of vector-gradient-field employed be a vector wavenumber field. This preference arises simply from the availability of a finished routine for accomplishing this task, as our current most highly preferred form of the apparatus does not actually use the scalar magnitudes that are part of the wavenumber field.

We nonetheless prefer, in view of the availability just mentioned, that the deriving means further comprise some means for calculating from the gradient field a covariance matrix, and from the covariance matrix in turn a scalar magnitude field for the wavenumber. In this case we also prefer that the system include some means for constructing the vector wavenumber field as the scalar magnitude field with directedness of said vector gradient field.

In preferred embodiments of yet a sixth main facet or aspect of the invention, the apparatus includes some means for computing power spectral density of at least a portion of the test image. In addition it includes some means for applying the power spectral density to estimate an assumed dilation of the test image relative to a reference image.

Also the apparatus includes some means for comparing the test data with the reference data, taking into account the estimated dilation. Further included are some means, responsive to the comparing means, for making an identity-verification decision.

The foregoing may represent the sixth main aspect of the invention in its most broad or general form. Even as thus formulated, however, this facet of the invention provides an extremely important contribution to the art of fingerprint and other skin-pattern-print analysis.

As will be explained in greater detail later in this document, power spectral density (or "PSD") can be made to reveal both the spacing and directionality of skin-pattern ridges—particularly within a small area of a pattern. By comparing the spacing portion of a PSD for a test image with the like portion of a PSD for a reference image or "template", the present invention is thus able to read off the relative dilation of a test image relative to a reference image, for corresponding areas.

In this way, as will shortly be seen, the invention produces excellent approximations to the results of not only the early global search of the Thebaud patent document but also the later gradient search with its holistic nonisomorphic distortion fields. The PSD technique, once systematized and made efficient, also can be used for screening prints at acquisition to be certain that energy is present in spatial wavebands characteristic of skin-pattern prints.

A calculation of two PSDs, however, unlike the time-consuming procedure taught by Thebaud, for a small region takes a very small fraction of the time which his apparatus requires—most typically between one and two orders of magnitude faster overall. Thus the present invention is able to achieve very nearly the same results in considerably less than a tenth the time.

In preferred embodiments of a seventh of its major aspects, the invention is closely related to that of the sixth but with respect to rotation rather than dilation. Once again a good estimate of relative rotation is accomplished merely by comparing the orientational portion of a test-image PSD with the corresponding portion of a reference-image PSD.

Through finding both the relative dilation and rotation in this way, the invention is able to estimate the entire isomorphic distortion with surprising accuracy. Through use of a multiple set of regions covering a full print area, or at least the area of overlap between reference and test images, the invention also approximates adequately the nonisomorphic distortions found by Thebaud.

Preferred embodiments of an eighth main aspect of the invention are also related to analysis by PSD comparisons. The apparatus here includes some means for computing power spectral density of at least a portion of the test image and of the reference image, respectively.

In this main facet of the invention, the apparatus also includes some means for transforming the respective computed power spectral densities to polar coordinates. Through this innovative tactic, the transformed power-spectral-density information—which now can be interpreted as rectangular-coordinate data—has the form of power-density values plotted on a rectangular grid of ridge spacing and orientation.

In addition the apparatus includes means for considering the transformed power spectral densities for such test and reference images together. These means also have the further function of reading off from the "considered-together" power spectral densities an estimate of such assumed relative rotation and dilation.

The particularly favorable result, in the case of this eighth aspect of the invention, is that even greater time savings and efficiency can be gained by expressing the ridge orientation and spacing as fields defined within the same rectangular grid and rectangular-coordinate mathematics as are applicable to most of the other procedures in the fingerprint analysis. All these advantages are further enhanced by preferred operating modes such as ratioing the respective ridge-spacing and orientation values, or correlating the two transformed power spectral densities—within a hypothesis range of relative rotation and dilation—to find an estimate of the most probable relative rotation and dilation.

In preferred embodiments of a ninth of the main aspects or facets of the invention, the apparatus includes some means for estimating relative translation, and at least one component of relative isomorphic distortion, between the test and reference images. It also includes means for adjusting the test or reference image, or both, to allow for the estimated relative translation and component of relative isomorphic distortion.

Further the apparatus includes some means for comparing the test and reference images, after the adjustment, within substantially all area that is common to both images, to make an identity-verification decision. As will be noted, this advantageous operating scheme is in common with the invention set forth in the previously mentioned Thebaud patent document—and represents a potent advance over the prior art.

We prefer, however, to practice this ninth aspect of the invention in conjunction with certain other facets or aspects that maximize enjoyment of the benefits of the invention. For example we prefer that the comparing means include means for analyzing power spectral densities within the common area to estimate remaining distortions.

In this regard we prefer that the comparing means include some means for dividing one of the images into a multiplicity of substantially overlapping subregions that in the aggregate cover substantially the entire said one image; and additional means for evaluating the degree of similarity of said test and reference images, with respect to substantially every one of said subregions of which a significant fraction is within said all area common to both images.

In this way the capability of the PSD to yield rotation and dilation information very quickly and efficiently for small areas is exploited to obtain an estimate of such information for quite large areas. Preferably the evaluating means include some means for estimating, within each of the subregions in the common area respectively, a further component of relative distortion between test and reference images.

Preferably evaluating means form a composite measure of the "further components" for all of said subregions in the common area; and means for thresholding that composite measure to make said decision. Also preferably the apparatus extracts from the test data an estimate of noise variance in the test data as a function of position in the test image; in this system the composite-measure forming means take into account the estimated noise variance—and preferably weight the further component of distortion, for each of the subregions in the common area, in an inverse relation with the noise-variance estimate for that subregion.

In preferred embodiments of yet a tenth major aspect of the invention, the apparatus includes some means for comparing a first small region of the reference data with the test data to form a first measure of similarity. It also includes first means for testing that first measure against a first threshold to verify such person's identity.

In case the first measure is not high enough for acceptance, the apparatus also includes some means for then comparing a second small region of the reference data with the test data to form a second measure of similarity—and associated second means for testing said second measure against a second threshold that is higher than the first threshold, to verify such person's identity. As will be noted, it would be more expectable after failure of the first measure to test against a second measure that is lower, but that is not the case in the tenth major aspect of the present invention.

The reason for this anomaly is that the second test employs a smaller window. This strategy is adopted on the basis of the reasoning that the first test may have failed in recognition merely because too much distortion is present to allow recognition over the area of the first test: it is a small area, but that of the second test is relatively even smaller.

Several other preferences will appear. In particular, the first testing means also test the first measure of similarity against a first, relatively low, rejection threshold to deny verification. The second comparing means operate only if the first measure of similarity is between the first acceptance and rejection thresholds—i.e., if the first measure of similarity is neither high enough for acceptance nor low enough for rejection.

Preferably the second testing means also test the second measure of similarity against a second rejection threshold that is higher than the first rejection threshold, to deny verification. As noted above, the second small region is smaller than the first small region.

Also preferably, in event the second measure is between the second acceptance and rejection thresholds—so that the second measure is neither high enough for acceptance nor low enough for rejection—then the system compares substantially the entire common area of the test and reference images to make a verification decision.

Preferred apparatus embodiments of yet an eleventh independent facet or aspect of our invention diverge somewhat from the first seven. The apparatus here is for receiving surface-relief data from a sensor that acquires surface-relief data from a relieved surface such as a finger—and in response controlling access to facilities, equipment, a financial service, or a system for providing or receiving information.

The apparatus is for use in the presence of an assumed dilation of the relieved surface. The apparatus includes a system for processing the received data to determine identity of the relieved surface. In addition to the previously mentioned instruction-holding memory means, this system includes:

means for calculating and comparing power spectral densities of at least a portion of the received data and test data respectively, and analyzing the power spectral density comparison to estimate the assumed dilation, means for comparing the test data with reference data, taking into account the estimated dilation, and means, responsive to the comparing means, for making an identity-verification decision.

In addition, the overall apparatus includes some means for applying the determined identity to control access to such facilities, equipment, financial service, or source or reception of information. Thus this aspect of the invention, while specifically incorporating the dilation-estimating feature mentioned above in connection with the fifth independent aspect, particularly focuses on and includes, as part of the invention, components that actually control access to various types of utilization means.

A twelfth independent facet of the invention involves a further divergence, in that it is a secured system subject to access control based upon surface-relief data from a relieved surface such as a finger. This system is for use in the presence of an assumed distortion of the relieved surface.

The system includes utilization means, susceptible to misuse in the absence of a particular such relieved surface that is related to an authorized user. The utilization means being selected from the group consisting of:

a facility, apparatus, means for providing a financial service, and means for providing or receiving information.

In addition the system includes sensor means for acquiring surface-relief data from such a relieved surface.

The system also includes some means for processing the data to determine identity of the relieved surface, and for applying the determined identity to control access to the utilization means. These processing and applying means include, in addition to the instruction-holding memory means:

means for calculating and comparing power spectral densities of at least a portion of the received data and test data respectively, and analyzing the power spectral density comparison to estimate the assumed dilation, means for comparing the test data with reference data related to the particular relieved surface related to the authorized user, taking into account the estimated distortion, and means, responsive to the comparing means, for making an identity-verification decision.

Thus this aspect of the invention includes the utilization means themselves, as well as the access-control intermediary that is included in the eighth aspect of the invention.

While thus focusing on and including the utilization means, the invention makes use of the distortion-estimating feature discussed earlier in connection with the sixth independent facet of the invention.

In yet another of its independent aspects or facets, preferred embodiments of the invention take the form of a method, rather than apparatus. This method is for verifying the identity of a person. The method does so by comparing test data representing a two-dimensional test image of that person's skin-pattern print with reference data derived from a two-dimensional reference skin-pattern print image obtained during a prior enrollment procedure.

The method includes the step of ratioing or correlating power spectral densities of corresponding regions of the test and reference images to determine relative isomorphic distortion between the images. Another step is using a normalized spatial correlation value as a measure of similarity between corresponding regions of the test and reference images.

Furthermore the method includes the step of making an identity-verification decision based on said normalized spatial correlation value. Another step is, in nonvolatile memory, holding instructions for automatic operation of the foregoing steps.

Thus the method partakes of the advantageousness of the apparatus embodiments of the power-spectral-density aspects of the invention, discussed earlier. Preferably this method is optimized by incorporation of other features or characteristics, particularly the steps of operating a sensor to acquire the test data and—responsive to the decision-making step—operating a switch if identity is verified.

All of the foregoing operational principles and advantages of the present invention will be more fully appreciated upon consideration of the following detailed description, with reference to the appended drawings, of which:

BRIEF DESCRIPTION OF THE DRAWINGS

FIG. 6 is a conceptual diagram illustrating the finding of such a distortion field piecemeal from power spectral density analyses as in FIGS. 4 and 4a;

DETAILED DESCRIPTION OF THE PREFERRED EMBODIMENTS

Figure 1:
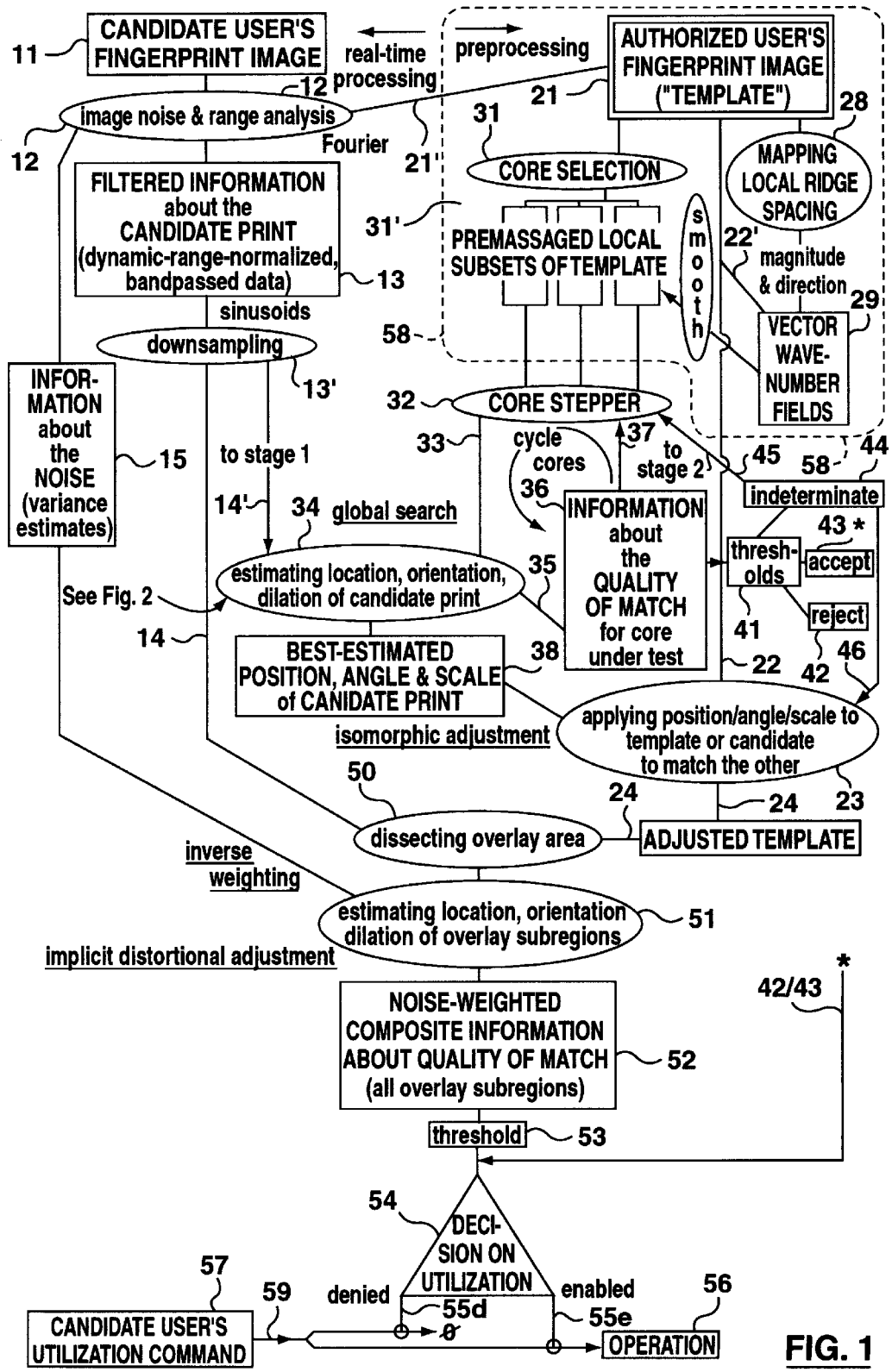
FIG. 1 is a flow chart or block diagram showing at a conceptual level, for certain preferred embodiments of our invention, how different portions of the programmed firmware perform the processes of the invention.

The first parts of this section set forth the operation of the system in purely descriptive terms. An "APPENDIX" then follows presenting the basic mathematics for actual practice of the invention.

Inputs

Preferred embodiments have at least three groups of inputs: one group of inputs from the candidate user of a weapon or other apparatus, another from the authorized user (or that person's surrogates), and the third implicitly from generalized population data. The candidate's inputs include a fingerprint-image data array 11 (FIG. 1) and a command 57 (at bottom left in the drawing) that the apparatus operate.

In FIG. 1 the general format of the first illustration of the Thebaud patent document has been retained, to more plainly highlight both the similarities and the differences between the present invention and that of Thebaud. Parallel reference to Thebaud's FIG. 1 is suggested, and the reader's familiarity with the disclosures set forth in the Thebaud patent document is assumed.

The data array 11 originates from a skin-pattern detector, which is most representatively an optical sensor array but may instead be of another type such as capacitive, variable-resistive or high-frequency acoustic. In an embodiment that is now most highly preferred, the command 57 takes the form of the optical signals that result from placing the user's finger etc. on the sensor contact surface, though in other embodiments the command 57 may come from operating a switch—e.g. a microswitch actuated by pressure on the sensor contact surface.

The authorized user's inputs include a fingerprint-image data array 21 (originating analogously to the array 11 for the candidate user, discussed above), and implicit parameter settings such as thresholds 41, 53 which reflect the desired certainty with which a fingerprint match must be found. The authorized user does not necessarily personally enter these parameters into the system, but may instead indicate to a technician a selection of the value, or acquiesce in the value, of such parameters.

The several threshold parameters 41, 53 etc. are related to the relative numbers of false positives and false negatives to be tolerated—but not necessarily in an arithmetically direct way. In the Thebaud system the relationship is rather complicated and statistical as he explains; but for purposes of the present more streamlined system design, relatively direct and straightforward thresholding is preferred.

The values used as thresholds 41 are actually dual—one controlling rejection 42 of the candidate and another controlling acceptance 43. (As will be seen shortly, the thresholding is truly quadruple rather than dual, since two different values are used at different points in the procedure for each of the two thresholds just mentioned.) All these values are selected to reflect the type of usage anticipated. In particular, they control respectively the probability of false negatives (establishing the "desired certainty" of acceptance for the authorized user) and the probability of false positives (establishing in an inverse way the desired certainty of rejection for an unauthorized user).

For example, if the apparatus is to control access to an advance-fee-based gymnasium, the primary objective may be merely to discourage occasional cheaters. In this case the threshold for acceptance 43 (for the prepaid customer or member of the gym) may be set rather low, and that for rejection 42 very low—accepting a significant chance of letting in someone who has not paid.

Similarly if the apparatus is a weapon to be used in the field by military or police personnel, a primary objective may be to have use of the weapon available to the authorized user without delay and without question. In this case the thresholds for acceptance 43 and rejection 42 may be set relatively low—accepting some small chance that the weapon might be usable by an opponent who takes it from the authorized user. In this case, however, since there are significant risks associated with an opponent's appropriation of a weapon, the acceptance threshold might not be set quite as low as in the first example above where the adverse consequences of admitting a cheater are minor.

Now in a contrary example, for control of access to a secure area containing documents or apparatus of utmost sensitivity, a primary objective may be to exclude spies. In this case the certainty level for acceptance 43 (hopefully, of authorized personnel) may be set distinctly high, and that for rejection 42 also quite high—accepting some significant likelihood that an authorized individual may be delayed in entry by having to repeat the verification procedure.

Similarly if the apparatus is a weapon to be kept in a home for protection against intruders, a primary objective may be to prevent unauthorized use by children or teenagers who live or visit in the home. In this case the thresholds may be set relatively high—accepting some small degree of unreliability in the weapon's availability for use against intruders—but perhaps not as high as in the immediately preceding example, since delayed availability of a weapon to an authorized user in an emergency is ordinarily much more onerous than delayed entry to a secure area.

A third, implicit type of input is a statistical set (not shown) preferably coming from neither the candidate user nor the authorized user, but rather from a generalized database representing people in general. These are used in setting the specific levels of thresholds for various purposes, and also for use of the variance estimates 15, etc.

These statistical data are ordinarily derived without reference to the particular people known to be involved, and may be called "prior statistics" or "a priori statistics". They may be employed at certain points in the processing to take into account the known degree of variability in the way people place their fingers on a fingerprint-acquisition imaging device. This variability may differ depending on the position and orientation of the imaging device in relation to the user.

For example, variability in a panel-mounted imager at an automatic teller machine may be expected to have a statistical pattern that is different from variability in a desktop imager in an office. Variability in an imager that is built into a tool (e.g., a weapon) may be expected to be different still.

In some cases, particularly where a user typically is standing while applying a fingertip to a stationarily mounted imaging device, this variability may depend in part upon the height of the user. In any event it is preferable to collect a different a priori data set using the actual type of imager and collection geometry for which a particular apparatus will be used.

In special cases, initial data acquisition may show that the authorized user's fingerprints have very unusual properties or characteristics. In such extraordinary cases better performance may result from using a statistical set 17 derived from input data 21 for the authorized user.

Such provisions require a lengthier procedure for enrollment or registration of the authorized user, to establish not only this user's fingerprint but also certain measures of the variability in this user's presentation of the print to the apparatus. For good results, furthermore, such a procedure should be deferred until the authorized user has acquired some familiarity with the apparatus, which intrinsically tends to lead toward habits of handling—and thereby not only to reduced variability but also to particular patterns of variability.

Such extra effort might possibly be justified in special cases, as for instance with a person who has an injury or a handicap that affects the posture or the attitude of the arm or hand. Another possible special situation perhaps may occur when a person of very unusually short stature, or a person in a wheelchair, will be placing a fingerprint on a device to operate an automatic teller machine where most users stand. Such special problems of stature, etc., if they prove significant may be best managed by assembling height-correlated and other specially correlated statistics.

In general the use of a priori statistics, ideally collected from users who have already formed habits in placing fingers on imagers, appears preferable.

Procedural Overview

A glance at the bold vertical lines 14, 22 in FIG. 1 reveals that the fundamental scheme is to direct signals 12–14–14' from the candidate fingerprint image data 11, and signals 22–24 representing the authorized user's preprocessed fingerprint image data or "template" 21, to a common final comparison 41 or 53. Certain side calculations or signal paths 15, 28–38 along the way facilitate and enhance the comparison.

One major departure from the Thebaud system is that the comparison does not necessarily proceed all the way to the threshold decision 53 near the bottom of the diagram. Rather, that route is reserved only for candidate data that persistently fall between thresholds 41 for rejection 42 and acceptance 43—in other words, for candidate information that are indeterminate 44, within the earlier procedures 32–37, 41–45 in the upper portion of the diagram.

In the case of an early rejection 42 or acceptance 43 in response to the dual or quadruple thresholds 41, the asterisked bypass path 42/43 is followed to the final decision 42. Here the system physically implements the denial 55$d$ or enablement 55$e$ of access to some utilization means which the system is set up to guard.

Results 42/43 of the early thresholds 41, or the result of the later thresholding 53, interact with signals 59 generated by the candidate's command 57—to determine whether the command 57 produces no perceptible action at all $\phi$, or produces operation 56. (The invention encompasses including a no-function warning light or tone, rather no perceptible action, if utilization is denied 55$d$.)

Initial acquisition and preprocessing of image data, whether for candidate 11 or authorized user 21, is described in a later section of this document. There is some overlap between that later discussion and the sections following here immediately—which relate only to what appears in FIG. 1.

Preliminary Processing of the Candidate's Data

Processing of the candidate image data 11 begins with analysis 12 of the dynamic range of signals which represent grooves and ridges within the image. The result includes forming a new image-data version 13, in which this dynamic range is normalized, i.e. locally stretched or compressed to precisely match the overall range of the later processing stages.

In addition the new version of the image is subjected to Fourier analysis—expressing the data as spatial sinusoids—and bandpass filtering, to eliminate inappropriate spatial frequencies in the image version 13. In the analysis 12, preferably (but not necessarily) spatial frequencies are treated as "inappropriate" if they are not spatial frequencies 21' that could have originated from the similarly preprocessed print (template) 21 of the authorized user.

Preprocessing of the authorized user's print to obtain the template will be described later. In such original preprocessing, spatial frequencies can be rejected based on a more leisurely harmonic-content analysis of the authorized user's print.

Closely associated with the range analysis 12 and resulting bandpassed, normalized sinusoidal data 13 is a downsampling step 13' which greatly reduces the amount of data to be processed in all later stages of the procedure. This step 13' is important because it can make the difference between a procedure that is unacceptably time consuming and a procedure that is practical.

To be sure it is also important that the procedure be accurate. Properly controlled downsampling at this step, however, does not degrade overall performance. More specifically, it is known that the data 13 are represented sinusoidally, and that these data cannot have major components at finer spatial frequencies than the smallest spacing of troughs or ridges in the authorized user's print 21.

Accordingly, in downsampling 13' it suffices to preserve representative values at a reasonable fraction less than half of that smallest periodicity—or for example about one third of the average periodicity. Once again the template frequency content 21' is useful, in guiding selection of an optimum spatial frequency for use in the downsampling step 13'.

Philosophical Overview

Four important characteristics of the invention can be gleaned already from the foregoing discussion of blocks 12 through 13' in FIG. 1. First, the assumption is made throughout that the candidate user is the authorized user—and that this assumption can be confirmed, if only we conduct a fair comparison.

It might be supposed that this assumption will lead to an overwhelming number of false-positive test results. Such a supposition would be incorrect, for it has been found that a fair comparison will only highlight the underlying differences in information content between an unauthorized candidate (impostor) and the true authorized user.

The present detailed description, as it unfolds, will make progressively more apparent that each intermediate process step of the invention—when practiced upon a typical impostor's print—is most likely by far to lead to a decisive denial 55d.

The assumption under discussion is also confirmed from the opposite perspective: what happens if the candidate user is in fact the authorized user? A fair comparison is absolutely essential to eliminating the effects of enormous variation in fingerprint appearance due to details of operating conditions. Such details include, in particular, the physical and emotional condition of the user—and these considerations are especially important to avoid rejecting the authorized user.

Thus the assumption that the candidate is the authorized user only leads to a very great reduction in the amount of data to be processed, and a very great increase in reliability of the results.

A second characteristic of the invention is a plan—but more a plan-in-reserve than an overriding plan as in Thebaud—to form respective versions of the two data sets 11 and 21 which are adjusted to be as much alike as possible. This adjustment, however, is only with respect to certain data properties that are known to be variable within multiple trials or instances of essentially any single user to form a print.

These particular variable data properties, within their known degree of variability, are at best immaterial (and at worst misleading) to identification or verification. The invention is accordingly fashioned to ferret them out, so that they can be canceled out—in a word, to ignore them.

In doing so, it is necessary to accommodate the extreme time pressure associated with the candidate-data processing. Conversely, relatively long times can be devoted to obtaining several instances of an authorized user's print—and selecting the most representative one(s) of them, and performing image enhancement on the best instances.

The shaded lines 58 enclose those portions of the data collection and processing that can be performed in advance, before deploying the apparatus or receiving the candidate user's command. These portions include establishment of an implicit statistical set and the thresholds 41, 53, as well as the authorized-user data collection and processing 21 through 31'.

A third characteristic of the invention is closely related to the first two. This characteristic is that the invention makes the template as clean and as definite as possible—and then exploits that fact by primarily relying upon the template, rather than upon the candidate data, wherever feasible.

An example of this is in the preferred use of the template to provide periodicity criteria 21' for both the analysis 12 and downsampling 13'—rather than relying upon statistics of the candidate data 11 for the bandpassing criteria. This strategy is preferred even though the analysis 12 does in fact extract those candidate-data statistics 15 for other purposes.

On the other hand, many instances of this characteristic of the Thebaud invention are absent in the present system, which has been very greatly streamlined and shortened. For example, the path 28, 29 for usage of vector wavenumber fields 29 now ends with use of those fields in smoothing; in the present system they—and their highly specialized gradient and quadrature forms—are not used in comparisons of the distorted template with the candidate data.

A fourth characteristic of the invention is that it operates on the data in terms of local sine-wave patterns, rather than as isolated binary data bits or linear (ridge and groove) structures. Thus the initial noise and range analysis 12 operates not only in positional space but also in Fourier space (in other words, in terms of the spatial frequencies in the candidate image), and the new version or filtered information 13 is presented as amplitudes of sinusoids associated with each region of the original image.

By virtue of this characteristic, while guided by detection theory the invention can also take advantage of the high computational efficiency and fidelity of the Fast Fourier Transform (FFT). The FFT performs a large fraction of the computationally intensive processes in the algorithm.

Preprocessing of the Authorized User's Fingerprint Images

During preprocessing 58 the authorized user provides a fingerprint that will be refined to form a template 21. Details of the refinement will be discussed shortly.

Where time permits, best results are obtained by acquiring several realizations, or successive trial images, of the authorized user's print—and analyzing them to determine which is most representative and whether they have any extraordinary character that may require special handling. This information is very useful in controlling the application of these data in the real-time processes that follow.

In some cases a user may appear to have more than one family or group of realizations—perhaps due to divergent, separate habits of gripping or presenting a finger. In such cases it is possible to assemble a composite of partial information from each of plural realizations, or even to store plural entire templates (with associated respective likelihoods of occurrence) to be tried alternatively in evaluating a candidate print 11, 13.

In any event, from the representative authorized-user print image or images 21, during preprocessing 58 the system selects 31 several—preferably exactly three—distinctive regions, subsets or windows 31'. These small, preferably circular regions 31' may be stored separately from the full template 21 as in Thebaud—but in the present system, in the interest of minimizing cost and time of transmission or storage, it is preferred to avoid such additional storage. Due to use of PSD analysis, it is no longer desirable to store numerous versions or variants of each region, prepared—as described by Thebaud—by applying a variety of crosscombinations of various-sized rotations and dilations.

In addition, a so-called "matrix covariance estimator" is used to map 28 magnitude and direction of local ridge spacings in the template 21—to form vector wavenumber fields 29, which are used in smoothing the data. (As suggested earlier, the present invention uses only the directionality and not the magnitude, related to ridge spacing, of the wavenumber fields, and accordingly a gradient field may be successfully substituted.) In the present invention such smoothing guided by wavenumber fields or other gradient-field forms is performed for the candidate data as well as the template; but after that has been completed, the wavenumber fields may be discarded.

In addition, flags are set up in certain of the vector wavenumber fields 29 to warn of phase reversals in the template data 22, as will be explained below. These warning flags are used in avoiding adverse effects of allowing the processing to continuously traverse phase discontinuities.

Using Candidate-data Variance Estimates

The previously discussed initial noise analysis 12 in the candidate-data (left) half of FIG. 1 may be considered roughly as a data colander, which separates data from noise. Both the data and the noise are then suitably directed, respectively, for beneficial use.

FIG. 1 shows that the data and the noise actually proceed to the same later stage 51 of the algorithm, in the sense that the later block 51 receives both data and noise. In that later processing module, however, these different pieces of information are separately received and very differently used.

Thus one of the above-mentioned side-calculation paths is application of the noise information 15 abstracted from the candidate data to enhance later stages of processing. This information 15 is in the form of an array or field of variance estimates, in effect overlaid on the reformed image data 13 themselves.

In other words the system constructs and keeps a separate index 15 of the reliability of the image data 13 in each region of the image, respectively. These reliability indices are used to weight the respective significance that is attributed to a comparison 52 based on data in the corresponding image regions.

Thus the final test decision 52, 53 depends more heavily on portions of the candidate data 11 that are relatively cleaner. The test is thus made to depend more lightly on portions that are relatively noisier. It will be noted, however, that this information is not needed for the early thresholding decisions 41–44—simply because the threshholding 41 is set so that those decisions represent extremely clear cases.

Such use of downweighted information, where the information is of lesser reliability, is far superior—in making maximum use of available information—to merely setting an arbitrary criterion of reliability and then discarding questionable information. The latter technique appears, for example, in Driscoll's selection of a very small number of "best-match" regions, and then proceeding directly to final decision based on such regions exclusively, regardless of the difficulty of the decision.

For any given intensity of calculation, and any given noisiness and distribution of noisiness in the candidate data, the downweighting maximizes the reliability of the results.

Global Search and Isomorphic Adjustment: Purpose

Another side calculation 31–38 has a dual function. It is this section which:

(1) in cases that present very clear decisions, leads directly and swiftly to a final answer and to control $\phi$, 56 of the utilization means; and (2) in cases that present hard decisions, provides a necessary measure of simple (shape-invariant) geometrical mismatches in the formation, or realization, of the candidate print image 11, relative to the template 21.

By the terms "formation" and "realization" we mean to distinguish variations in placement of a fingerprint from the information content of the candidate print itself.

Preferably for certain embodiments this second set of calculations 31–38, like the first, is partially performed in preprocessing time 58. These calculations 31–38 account for displacements or translations of the entire image, rotations of the entire image, and also dilations or contractions of the entire image resulting from variation in pressure with which the entire fingertip is pressed against the sensor. As will be understood, when increased pressure squashes the whole surface of the fingertip against the receiving surface, the whole fingertip surface may expand slightly—but preserving the original shape, i.e. isomorphically.

Of course the authorized user's initial print is taken with some applied pressure, so each candidate-print realization may be made with either more or less pressure than applied in making that initial print. Hence the amount of size change if characterized as "dilation" may be either positive or negative—or, if multiplicative, as a factor greater or less than unity.

The global search is "global" in two senses: first, the entire candidate print is canvassed to find one or more regions that most closely match certain preidentified portions of the template. Second, once the one or more best-match regions are found the remaining mismatch is treated as a positional/dilational error with respect to the entire useful area of both prints.

Identifying Comparison Regions for the Global Search

The comparison regions 31, also called "local subsets" and most preferably called "cores" of the template 21, are first identified 31 (and if desired their data separately stored) during preprocessing 58. They are identified 31 as regions that have some particularly distinctive character.

Such distinctiveness may be defined for example in terms of high rates of change of harmonic content. If preferred, within the scope of the invention they may instead be defined in more conventional ways—such as closely adjacent plural/multiple ridge or groove endings.

In the preferred embodiment, the choice of subset is made by locating a circular subset window in such a way as to minimize the values of the crosscorrelation function of the windowed subset versus the entire template image—at nonvanishing offset values. Preferably plural (ideally three) windows are established 31 in this way, each under the assumption that any already-established windowed region is unavailable.

In any event it is important that the selected windows contain essentially the most distinctive features of the authorized user's print, since they will be used either (1) to make a final decision 41–43 or (2) to guide the process of adjusting 23 the template 24 to match the candidate 14. If the features used were instead relatively common, the system would be more likely to make the decision or perform the adjustment incorrectly even if the candidate is the authorized user—resulting in a false-negative finding 55d.

Each of the cores selected 31 represents a view of a small part of the template, as seen through a small window. The size of the window is important: it must be large enough to contain a moderately complex and therefore truly distinctive set of features.

Nevertheless, it must be small enough to preserve correlation—which is to say, enable ultimate recognition—of its distinctive features when allowance is made for isomorphic translations, rotations and dilations, and even if the fingerprint has undergone more general locally-varying distortions. Furthermore, the core must be small enough to enable a preliminary recognition even with minimal (or no) preliminary isomorphic adjustment.

It is also desirable that the several identified 31 subsets be reasonably well separated from each other. If they are too close together, they may not be independent enough to complement each other in the ways to be described.

As suggested earlier, if a particular authorized user is found to have more than one discrete way of placing a finger on the apparatus then special provision may be made for accommodating this idiosyncrasy. (This case is to be distinguished from the normal range of positioning variation about a single mode of placement.) For instance it is possible to incorporate auxiliary memory, perhaps at added cost, to cover the extra storage requirements—for such an authorized user who has two or more fingerprint personalities.

Alternatively, and particularly if the authorized user happens to be interested in minimizing false positives rather than false negatives (incorrect acceptances rather than incorrect rejections), then an adequate solution may lie simply in planning to test fewer variations about each of two discrete placements.

The currently preferred embodiments of the invention focus upon automatic operation even in the authorized user's enrollment stage. Hence these special processing tactics are not part of the most highly preferred form of the invention.

Isomorphs and the Thebaud System

In later real-time comparison processing, the invention will search through the downsampled sinusoidal data 14, 14' from the candidate user, to find a closest available match for at least one of the cores from the authorized user. The way in which the subsets are prepared for such a search, during preprocessing 58, strongly influences both (1) the data-storage requirements for the system and (2) the time which passes while the prospective user is waiting for the invention to make its decision.

A tradeoff between these two factors, data storage and real-time processing, leads to two major alternative approaches to managing the subset preprocessing. At present the limiting consideration is time; however, in the future if much higher processing speeds become available it may become desirable to instead opt for solutions that reduce storage at the expense of time. Therefore both approaches will be outlined here.

For minimum data storage, it is possible to simply save each selected core in the original form that appears within its respective small-window portion of the template. In this case, the cores shown as rectangles 31' in FIG. 1 may be identified on a one-to-one basis with those selected windows, though actually there are likely to be only three or four such windows.

This minimum-data-storage case is in fact an extremely important one, so that actually it is highly desirable to save each subset—and indeed the entire data set for an authorized user—in an abstracted or abbreviated form rather than in its original form. Accordingly these options are associated with one major preferred embodiment of the invention.

They are important in particular when a compact, self-contained system either must store many templates, for each one of many (e.g., a few thousand) authorized users, or must read in a template from a remote data bank—or from an identification card (e.g., with magnetic strip or bar code) carried by the user. Either of these cases puts a premium on smallness of the data file for each user, since full data (and even more emphatically preprocessed full data) are very costly to store within the system for multiple users, or to transmit or store on an ID card. This first major preferred embodiment is particularly applicable in environments where a short additional delay, perhaps a half second to a second, for calculations is acceptable—automatic tellers, office doors, etc.

In later real-time processing, however, if a subset is presented for comparison only in its original form, sifting through the candidate data 14' for a particular subset is relatively unlikely to succeed. This is true even if the candidate is in fact the authorized user, since there is a fairly strong likelihood that the subset of interest has been rotated or dilated, or both.

Therefore a fair test requires, to begin with, some equivalent of the Thebaud process of checking each region of the candidate data 14' against several rotated forms of the subset under test—rotated through different angles. In addition to a nonrotated subset, his preferred system checks eight nonzero rotations, ranging from negative (clockwise) through positive angles.

A fair test also requires some equivalent of Thebaud's process of checking each such region against several dilated forms of that same subset—dilated by different factors, ranging from values below unity through values above unity. His preferred system checks, in addition to a nondilated subset, six nonunity dilations.

Furthermore each region of the candidate data 14' should be subjected to some equivalent of Thebaud's process of checking against forms of that subset which have been both dilated and rotated—covering most or all crosscombinations of those same rotation angles and dilation factors. Taking into account the zero-rotation, unity-dilation cases, his preferred system uses nine rotations and seven dilations, for a total of sixty-three cases to be checked.

Each case represents rotation and dilation isomorphically—that is to say, without change of shape. Each of the sixty-three variants may be termed an "isomorph". As will be understood, for a representative three subset windows this works out to nearly two hundred isomorphs to be checked against each region of the candidate, and Thebaud's preferred system preforms and stores the resulting one hundred eighty-nine isomorphs as illustrated in Thebaud's FIG. 2—to which, again, reference is suggested.

Isomorphs and the Present Invention

None of those procedures is part of the most highly preferred embodiments of the present invention. We instead utilize a very different, streamlined estimating routine 34, 51 (FIG. 1) which is shown in greater detail in FIG. 2 of the present document. (This procedure is used not only in the estimating block 34 of the global search but also in the later analogous block 51 used in hard decisional cases.) The candidate data 14' first encounter this block as they enter the global search in what we call "stage 1" of the processing.

In our streamlined system, the template is windowed 34*a* about the location of the most highly distinctive core 31', 33—which is served to the estimator module 34 by the core-stepper block 32. (The other cores 31' are used only if no close relative can be found in the candidate data—since such an occurrence might be due to skin changes or folding as discussed later.) A spatial correlation 34*b* is then performed to locate the most similar region 38 (FIG. 3) in the candidate 14, 14'.

With the data expressed in sinusoidal terms, the desired output information—best-match location and quality of match—can be found efficiently by search for the correlation in Fourier space, as follows. First the Fourier transform of the candidate print is multiplied by the Fourier transform of the particular rotated, dilated subwindow of the template.

Then the resulting product is back-transformed, and the resulting real array holds the quality of correlation for each position of interest—i.e., for each position in the candidate print, just as if found by stepping across and down the candidate. In this array, the location of the maximum correlation value represents position in the candidate print, and the value itself is the quality of correlation at that position. Thus the procedure yields the best-match position of the subset in the candidate, and the quality of the match.

That best-match region of the candidate is then similarly windowed 34*c*. Now the system calculates and compares the power spectral densities, PSDs, of the image portions that are within the candidate and template windows respectively.

Figure 4:
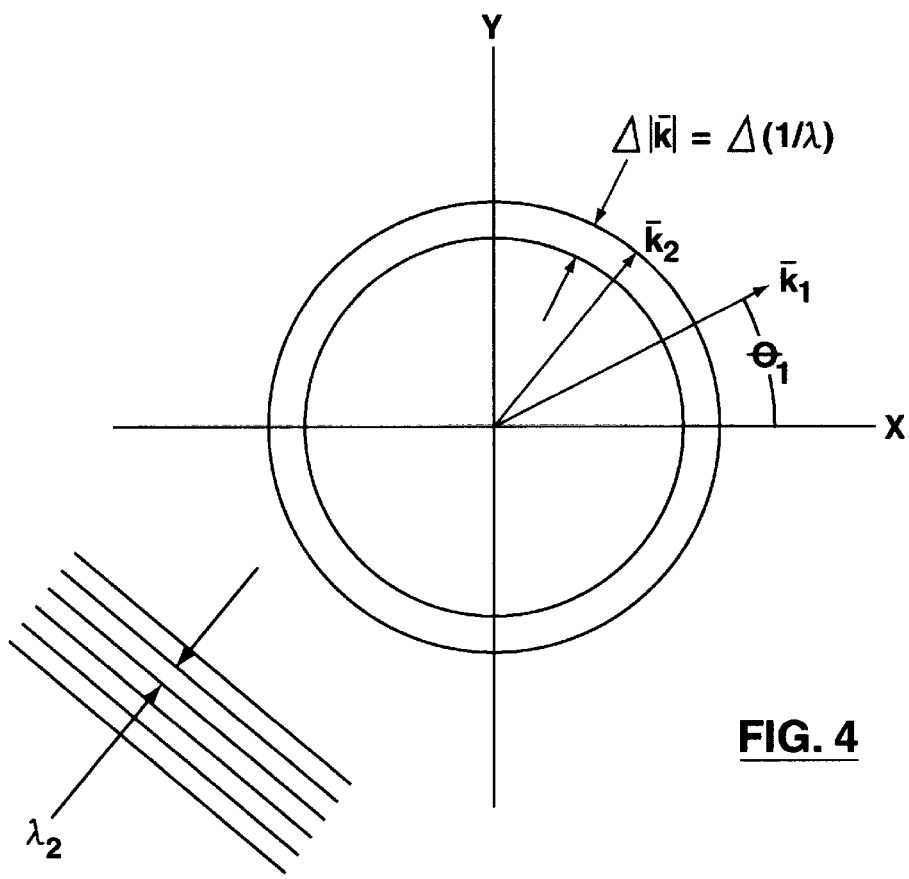
FIG. 4 is another conceptual diagram, conveying the general principle of determining relative dilation and rotation from a power spectral density graph.

Power Spectral Density, Ridge Spacing & Orientation, and Template/Candidate Dilation & Rotation We digress to explain the basis of our use of the power spectral density analysis. Each PSD initially is found in two-dimensional real space, in the rectangular-coordinate grid of the image data (FIG. 4).

The PSD appears in the form of power-spectral-density values in that grid. It is central to the PSD technique disclosed in this document that distance on a PSD graph such as shown has the dimensions of spatial frequency—i.e., wavenumber, or reciprocal ridge spacing. (The PSD graph is considered in Fourier space, which is to say spatial-frequency space.)

A particular PSD of interest manifests itself as a region in which a cluster of relatively high PSD values appears in the grid. Associated with such a cluster of high values is a vector $\vec{k}$, pointing from the origin into the cluster. For example, a general vector $\vec{k}_1$ of this sort, shown in the drawing, lies at an angle $\theta_1$ to the abscissa and has a length $|\vec{k}_1|$. This illustrated vector is representative of a vector pointing to a cluster of high values (not shown) in the grid in the region where the symbol "$\vec{k}_1$" appears in FIG. 4. By virtue of the above-mentioned significance of distance on a PSD graph, such a vector is closely related to the ridge characteristics in the analyzed window region.

In fact such a vector $\vec{k}_1$ is a wavenumber vector, whose magnitude by definition is the reciprocal of the characteristic, periodic ridge spacing $\lambda$, i.e. $|\vec{k}_1| \equiv 1/\lambda$, in the skin pattern being analyzed. Furthermore the angle $\theta_1$ of inclination of the vector $\vec{k}_1$ to the abscissa is the supplement of the angle at which the ridges in the windowed region are inclined to the abscissa.

The latter relation is shown for another vector $\vec{k}_2$ (FIG. 4), which as will be noted is perpendicular to the several parallel line segments at lower left in the drawing. These line segments represent local ridges, spaced apart at the regular periodic spacing $\lambda_2$ shown. As already suggested, the magnitude (length) of the vector, $|\vec{k}_1| \equiv 1/\lambda_2$—and its angle is:

$$180° - (\text{the ridge angle to the horizontal}).$$

Hence the location of a cluster of high values in the PSD grid reveals both the spacing and orientation of the ridges.

For example, horizontal ridges in the x-y plane produce a cluster of high PSD values only along the axis of ordinates, i.e. at top and bottom of the graph, but only at a radius equal to the reciprocal of the spacing of those horizontal ridges. Vertical ridges conversely produce a cluster of high values only along the abscissa—at right and left of the graph, also at a radius equal to the ridge-spacing reciprocal.

Furthermore an incremental distance, such as the annular thickness $\Delta|\vec{k}|$ marked in the drawing, represents a band of spatial frequencies (wavenumbers) $\Delta(1/\lambda)$—or, to put it another way, a range of ridge spacings $\lambda$. The length of a particular vector $\vec{k}$ can therefore be compared with preestablished circular annuli representing common ranges for spatial wavelengths, to determine which preestablished spatial bandwidth to use in fingerprint analysis. This fact we employ in preprocessing as will be set forth later in this presentation.

In practice this form of analysis is subject to a redundancy: energy-value clusters appear at diametrically opposite sides of the origin, and spaced equally from it. One may think of this duplicate information as corresponding to the fact that an array of parallel straight lines—such as that illustrated—is symmetrical; that is to say, such an array is equivalently traversed in either direction by a normal path. In any event, consideration of both sides of the array is not necessary, and we prefer to analyze just the right half.

Since each PSD represents the ridge spacing and orientation of the respective specimen, a suitable comparison will yield the difference, or the ratio, or any other desired relationship between the respective ridge spacings—which may be recognized as related to dilation—and between respective angular orientations of the ridges, which may be recognized as related to rotation. We prefer to correlate the two PSDs, which has an effect closely related to reading out 34*d* the ratio of ridge spacings and the difference between the angular orientations.

Figure 4A:
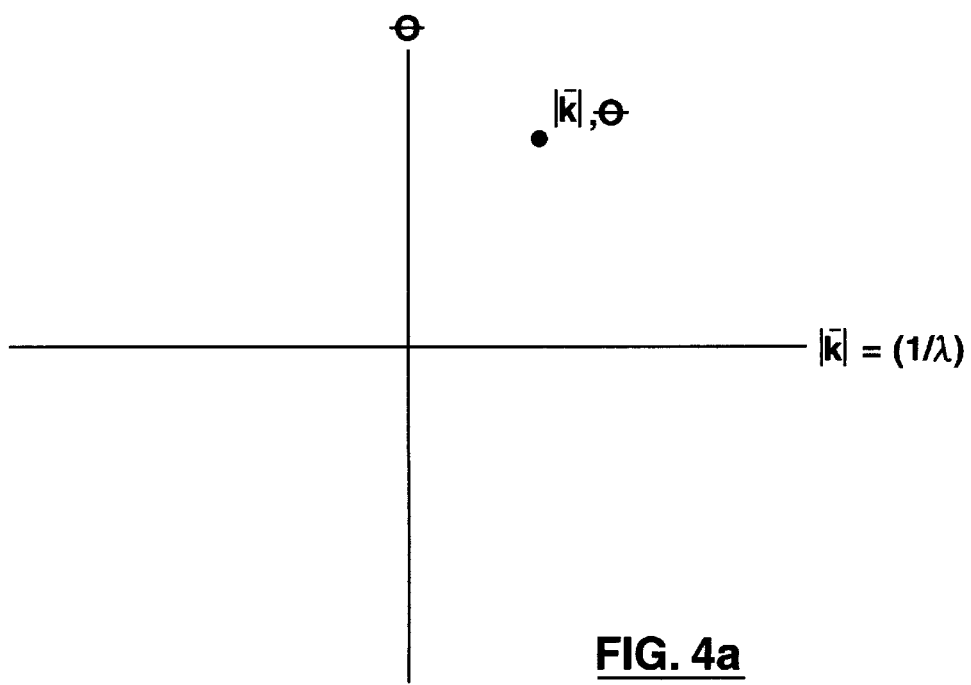
FIG. 4a is a like diagram conveying the use of a rectangularized (polar-coordinate) form of the FIG. 5 graph.

To facilitate this process, as mentioned earlier we prefer to apply a conventional transformation that yields the vector characteristics in polar coordinate. These in turn may then be interpreted as rectangular coordinates, so that the two variables $|\vec{k}|$ and $\theta$ become, e.g., the abscissa and ordinate respectively of a new grid (FIG. 4*a*)—but one in which the high-value PSD cluster can still be plotted, at $|\vec{k}|$, $\theta$.

With both the template and candidate data expressed in this form, dilation and rotation can be obtained by any process that has the effect of (for example) ratioing the values along the abscissa, $|\vec{k}_C|/|\vec{k}_T|$, and subtracting the values along the ordinate, $\theta_C - \theta_T$. If only PSD values from the right half-plane in FIG. 4 are recorded, only the right half-plane in FIG. 4*a* has data.

Continuing Stage 1 of Processing

Figure 2:
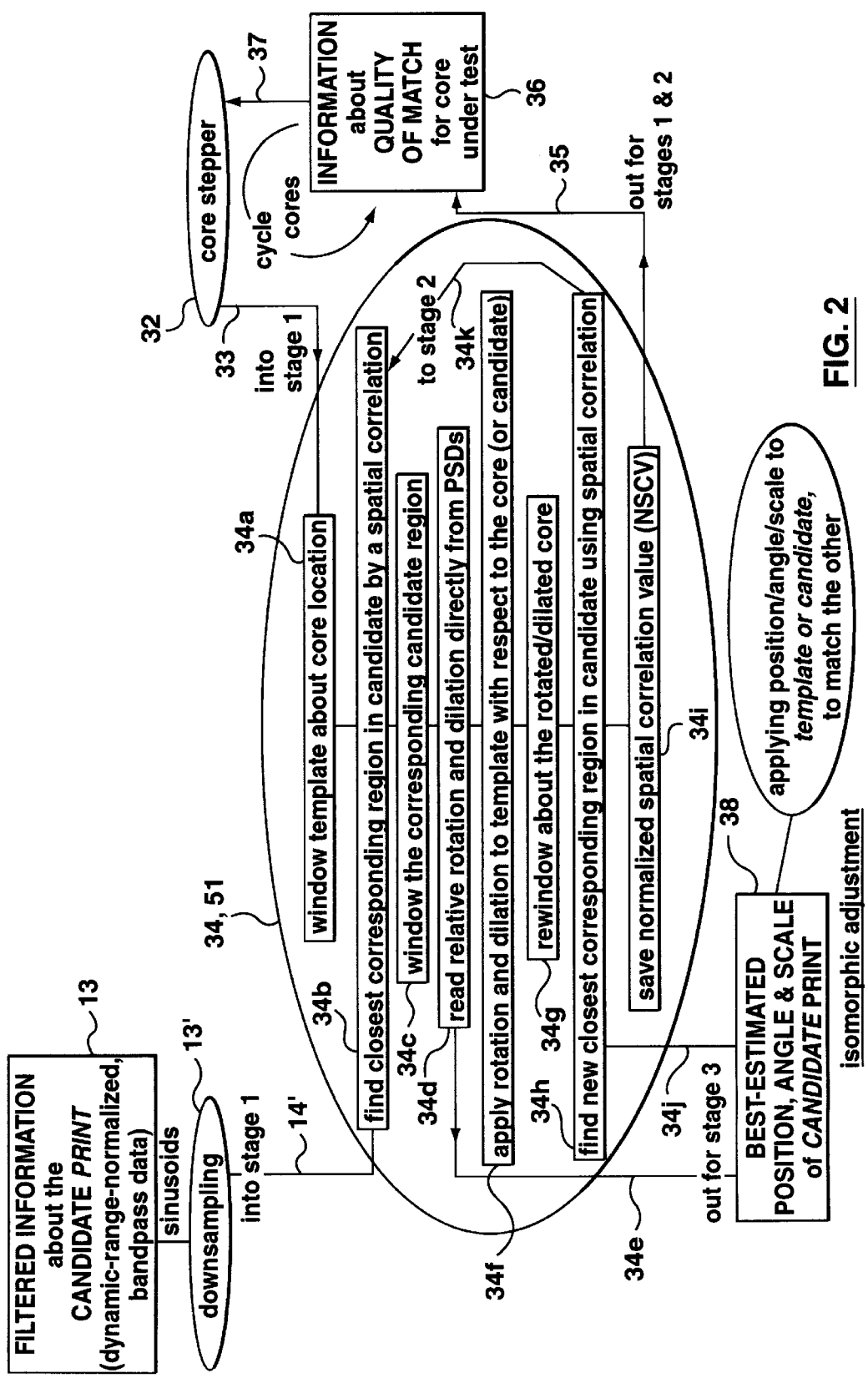
FIG. 2 is a like chart or diagram of details within a particular routine or module of FIG. 1—namely, a routine that is used in block 34 and again in block 51, and also in a preliminary procedure that prepares the authorized user's add fingerprint data ("template") for use.

With this insight into the PSD technique in mind, we resume now our discussion of the estimator routine 34 (FIG. 2). In the first pass through this procedure—i.e. in the initial pass through the global-search estimator block 34—the system refines this determination by applying 34*f* the found rotation and dilation to the template.

Figure 3:
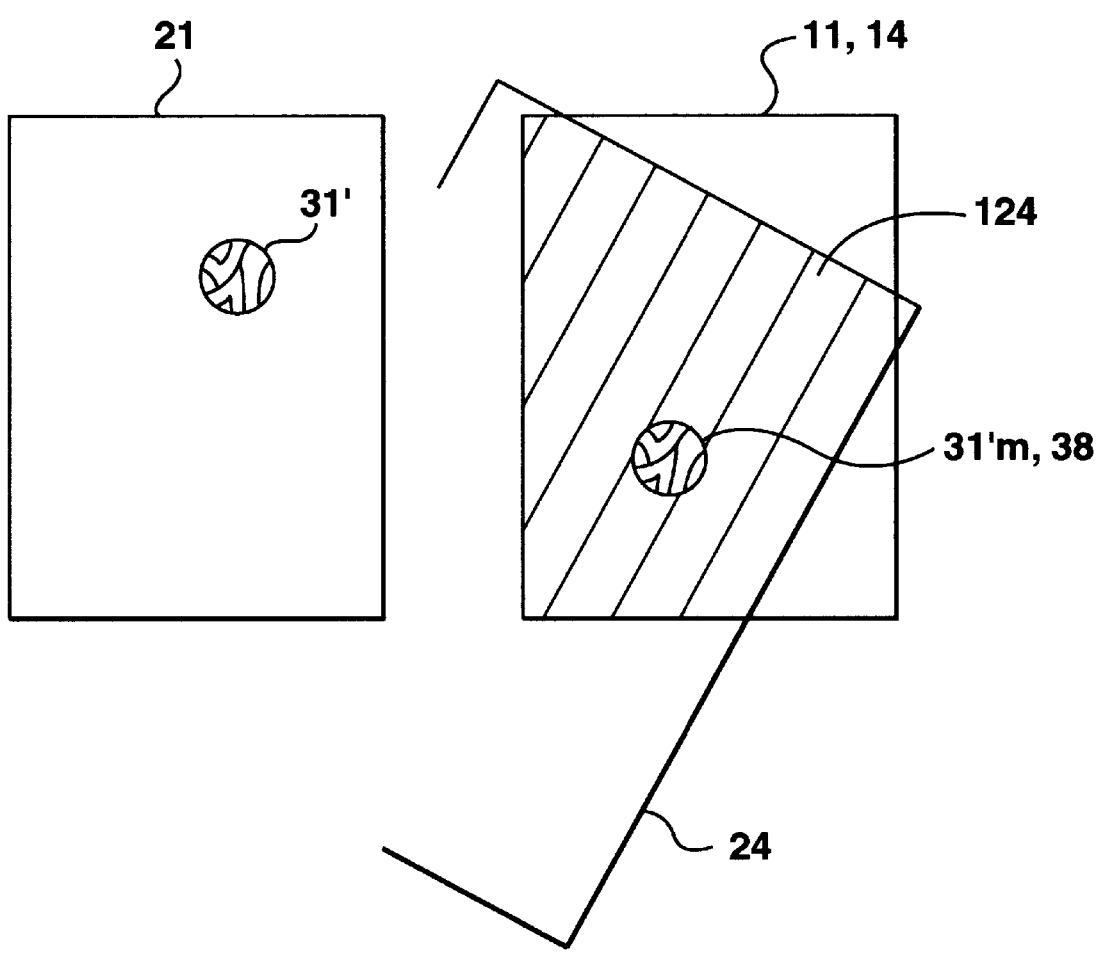
FIG. 3 is a rough conceptual diagram of a candidate user's fingerprint superposed in position on the authorized-user template, as linked with the template by a particular isomorphic distortion found by the processes of the present invention.

The template 21 is thereby reoriented, and expanded or contracted, to form a manipulated version 24 (FIG. 3, but not yet the like-numbered block in FIG. 1). This is the version that offers the fairest possible comparison with the candidate image in the respective particular regions selected (the core in the template, and the correlation-chosen region in the candidate).

When the candidate is actually the authorized user, a particular matching isomorph 31'*m* (see also FIG. 2 of Thebaud)—clockwise-rotated and rather strongly dilated, in the particular example chosen—will in general appear in a different position in the candidate data as compared with the template (FIG. 3). The association of such a structure 31'*m* with both the template 21 and candidate data 11 thus links the two data sets together.

In our invention, the correlation that corresponds to the amount of distortion necessary to obtain the match is used as one indicium of the plausibility of the proposition that the candidate and authorized user are one and the same. This is our test mechanism for the preliminary threshold tests 41–44.

FIG. 3 also demonstrates how an isomorph 24 of the entire template 21 can be used for a fuller and most-fair comparison. Just such information 38 is what is sought by the global search 32–37, for later use in the possible case that the preliminary threshold tests 41 are indeterminate.

FIG. 3 is repeated from the Thebaud patent document, demonstrating that the present process provides an equivalent (though significantly more efficient and economical) to his selection of isomorphic adjustment by stepping through an array of isomorphs. Both procedures produce an isomorphically adjusted template 24 which has a region 124 that is overlapping or in common with the candidate image 11, 14.

Since this adjustment may have an extremely pronounced impact upon the selection of matching region in the candidate, the template is next rewindowed 34*g* and the spatial-correlation step repeated 34*h* to locate a new closest-corresponding (i.e. similar) region 38 in the candidate. The newly selected region, like the earlier-selected one, has an associated spatial correlation value which represents the closeness of that closest correspondence. It is suitably normalized, to eliminate the confounding effects of different variance levels.

This normalized spatial correlation value or "NSCV" 34*i* is saved 35 to the quality-of-match block 36—and is then directly thresholded 41 (FIG. 1) to determine, as mentioned earlier, whether the processing up to this point is to be called a rejection 42, an acceptance 43, or indeterminate 44. Also saved for possible reuse in the indeterminate case is the closest-corresponding-region information 34*k*, as will be explained momentarily.

A rejection 42 or indeterminate result 44 may arise because a critical portion of the candidate user's skin pattern has been damaged or obstructed (as by small adhesions of dirt etc.). To accommodate this possibility, the core stepper 32—responding to a return path from the threshold block 41 which is not shown in the diagram of FIG. 1—cycles to the second (next most distinctive) template core, and the system proceeds again through the stage-1 loop. The same loop may repeat yet again—i.e., the stepper can cycle to still a third core—in event the thresholding concludes with a rejection or indeterminacy in the second pass through the loop.

The processing to this point concludes "stage 1" and, in case of rejection 42 or acceptance 43, essentially also leads to the decisional conclusion 54–56 of the entire operation. The results of rejection 42 or acceptance 43 have already been described, and it should be appreciated that some ninety-five percent of all verification procedures terminate with rejection or acceptance at this stage 1.

Stage 2 of Processing

In the case of an indeterminate route 44, the processing is bifurcated: if what has just been completed was "stage 1", the process makes a looping return 45 to the core stepper 32—initiating "stage 2" of the processing. If not, then processing is different as will be described shortly.

In the second, stage-2 pass through the global-search loop 32–37, operation is essentially the same—including starting with the first core, as before, and cycling to the others as needed—except that the window sizes are smaller, the thresholds 41 higher, and the closest-match regions 34*h* found in stage 1 are reused 34*k* rather than found again by initial spatial correlation 34*b*. As mentioned previously, the window-size and threshold settings reflect concern that the system may have failed, because of relatively strong isomorphic distortion, to give a properly high score 34*i* to the right region in the candidate in the correlations 34*b*, 34*h*.

Such distortion is considered to have somewhat lesser disruptive influence on that spatial correlation step 34*b* if the window is smaller. On the other hand, with a smaller window the observed "normalized spatial correlation value" NSCV should be better. Hence the repetition of search and evaluation with smaller windows and higher thresholds.

Reuse 34*k* of the previously found best-match location in the candidate image is based on the reasoning that the system may be unable to function effectively in selecting a best-match location when operating with smaller windows. Another important difference is that the isomorphic distortion parameters 34*d* and new best-match region 34*h* are saved out 34*e*, 34*j* for use in a "stage 3" (to be described below) in case of a final indeterminate finding in stage 2.

The cases in which our system is able to reach a conclusive rejection 42 or acceptance 43, by the final iteration of stage 2, amount to a fraction on the order of ninety-nine percent. In all these cases total processing time for stages 1 and 2 is considerably less than one second—after image acquisition is complete.

When the system either exhausts these efforts or reaches an indeterminate finding with a core that does satisfy the minimum correlation requirement, then processing branches 46 (FIG. 1) from the indeterminate path into an isomorphic adjustment module 23 that is the beginning of "stage 3". At the same time the best saved-out data 38 from the various passes through the estimator routine 34 are also directed to the same isomorphic adjustment module 23—which also receives the template 22, as shown.

Stage 3 of Processing

The object of the isomorphic adjustment 23 is to form an adjusted version 24 of the template, from which isomorphic distortion has been nominally removed—so that as to the isomorphic distortions the two images 14, 24 match. The isomorphic adjustment module 23 applies the best-match position, angle and scale 38 as adjustments to the template 22, to yield the adjusted template 24—which now may be taken as the template 24 of FIG. 3.

In the isomorphic adjustment, as the name conveys, no change of shape occurs—but the entire template signal 22 (i.e., the template throughout all of its regions) is shifted, cocked, and dilated or contracted, to form an isomorph 24 of the entire template 21, that matches as nearly as possible the corresponding features 38 of the candidate print as found in the selected window 31'. While FIG. 1 shows adjustment or perturbation of the template 21, 22, for purposes of the present invention an adjustment or perturbation of the filtered candidate data 13, 14 preparatory to the comparison is essentially equivalent—and in fact that is what is done in a now-preferred commercial embodiment of our invention.

This step thus isolates for consideration one last perturbation that may be the reason for failure of the two images 11, 21 to completely match: nonisomorphic distortion, and more particularly a distortion field 45 (FIG. 4). This field is roughly conceptualized as a field of displacements 45a. The structure of the frame of reference itself, i.e. the web of the skin as distinguished from its pattern of ridges and troughs, may be symbolized by initially "fixed" horizontal and vertical grid lines 45".

Figure 5:
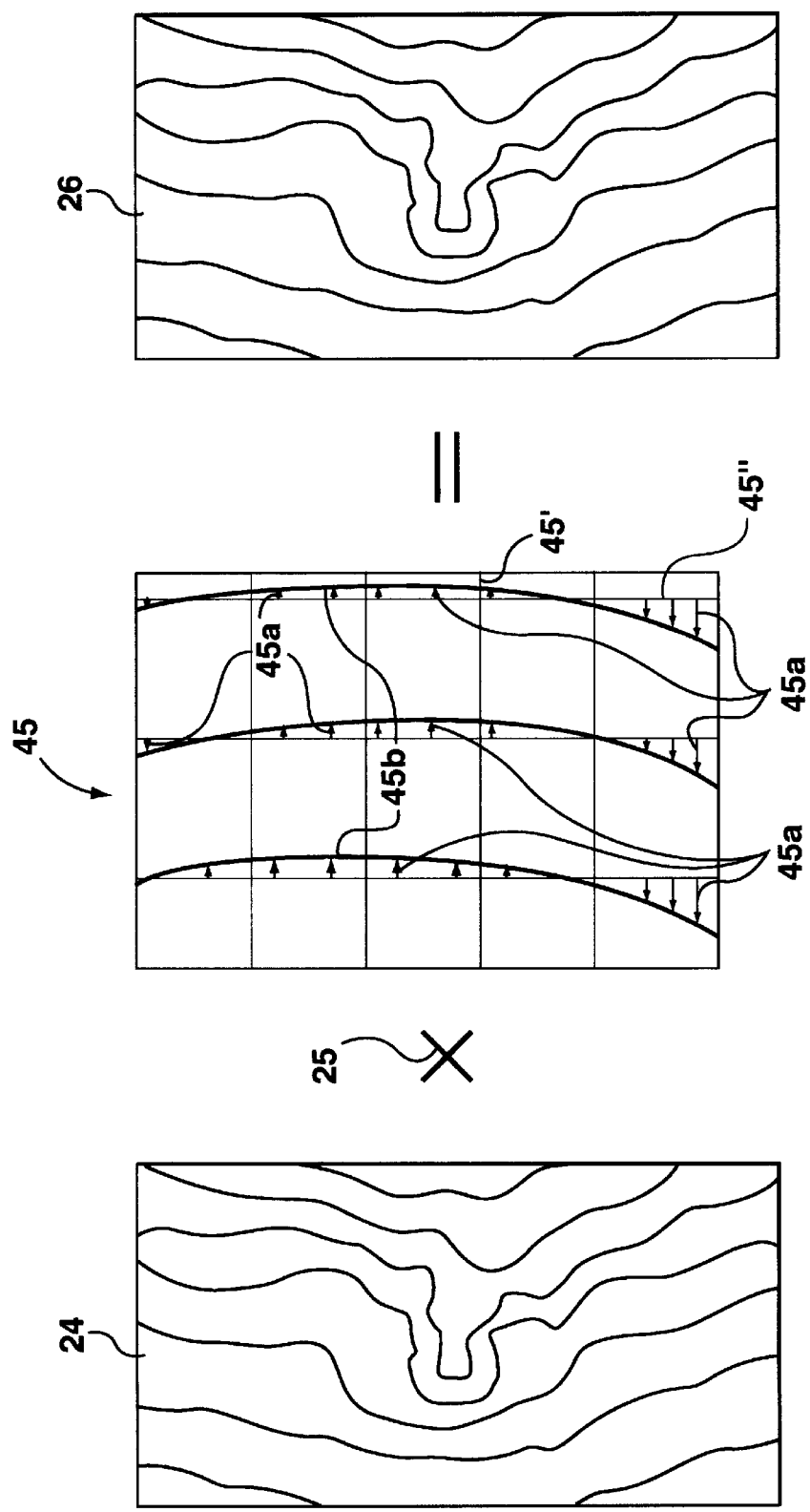
FIG. 5 is a rough conceptual diagram, conveying the general principle of applying a distortion field to modify the template.

The distortional displacements 45a are movements of, for example, the vertical grid lines 45" locally (i.e., nonisomorphically) to left in some places and to right in others, so that those grid lines 45" assume new forms 45b. FIG. 5 is taken from the Thebaud document, highlighting the fact that what is shown is the physical reality underlying the final stages of analysis in accordance with both inventions. (Arrowheads 45a representing the individual displacements are in many portions of the drawing very short, and so can be seen as only very small arrowhead tips.)

Even if the candidate is in fact the authorized user, there still exists a crucially important potential for mismatch between the adjusted template 24 and candidate data 14. That potential resides in the possibility of such twisting or other deformation in the candidate print.

In other words, the candidate user's finger may have been applied to the sensor surface in such a way as to distort the overall pattern. Such distortion consists of differential offsets, rotations and dilations internal to the pattern.

No single isomorphic adjustment can possibly take account of such internal differential effects. It is believed that this internal-distortion phenomenon may be most to blame for failure to reliably verify presence of an authorized user—false negatives—in even the most highly sophisticated of prior-art systems.

In the accompanying illustration for tutorial purposes the distortion field 45, 45a has been drawn very simplified, so that there are no displacements of the horizontal grid lines 45' although naturally in practice displacements of both sets of grid lines 45', 45" are expected. The drawing does show, however, that on balance the overall amount of leftward and rightward shifting is about equal—as it should be, since any isomorphic dilation or contraction should have already been incorporated into the isomorphic adjustment 23 which formed the first-adjusted template 24.

The symbol "x" in FIG. 4 is not to be misinterpreted literally as an actual multiplication. Though some complex multiplication is involved, that would be an oversimplification; rather the symbolism of multiplication is only intended at a rough conceptual-analogue level to represent application of a distortion field 45.

In the process described by Thebaud, the most probable distortion field 45—on the assumption that the candidate and the authorized user are one and the same person—is extracted from the data. That field is then applied to make one final correction to the template 24, yielding a NONisomorphic distortion-corrected field which is later used as a matched filter in a final comparison.

Thus in his final analysis what is of interest is the ridge/groove pattern rather than the nonisomorphic distortion. He focuses upon that component of distortion only temporarily and only for purposes of isolating and then canceling it—just as the global search isolated placement/dilation so that it could be globally (but isomorphically) canceled.

In the present invention the isomorphic distortion itself is estimated, still on the same identity assumption mentioned just above—but then its associated spatial correlation value (NSCV) is used as a measure of plausibility of the assumption. Where relatively large distortions 51, 52 are needed to equalize the candidate and template images, comparison with a preselected threshold 53 yields a decision 54 to refuse 55d access. Thus no attempt is made to form a nonisomorphic-distortion-corrected template.

For purposes of estimating the isomorphic distortion, the common or overlay area 124 (FIG. 3) is then dissected 50 (FIG. 1), enabling use of the PSD technique one last time, to measure the overall distortion needed to fairly call the two images fingerprints of a single person.

The total area imaged in the candidate print 11, 14 cannot be closely controlled to match the template 21, 24—and the template furthermore is shifted, angled and dilated. Naturally when the two data fields 14, 24 are eventually overlaid for comparison some areas of each data field will fall outside the other, and therefore be unusable.

Figure 6:
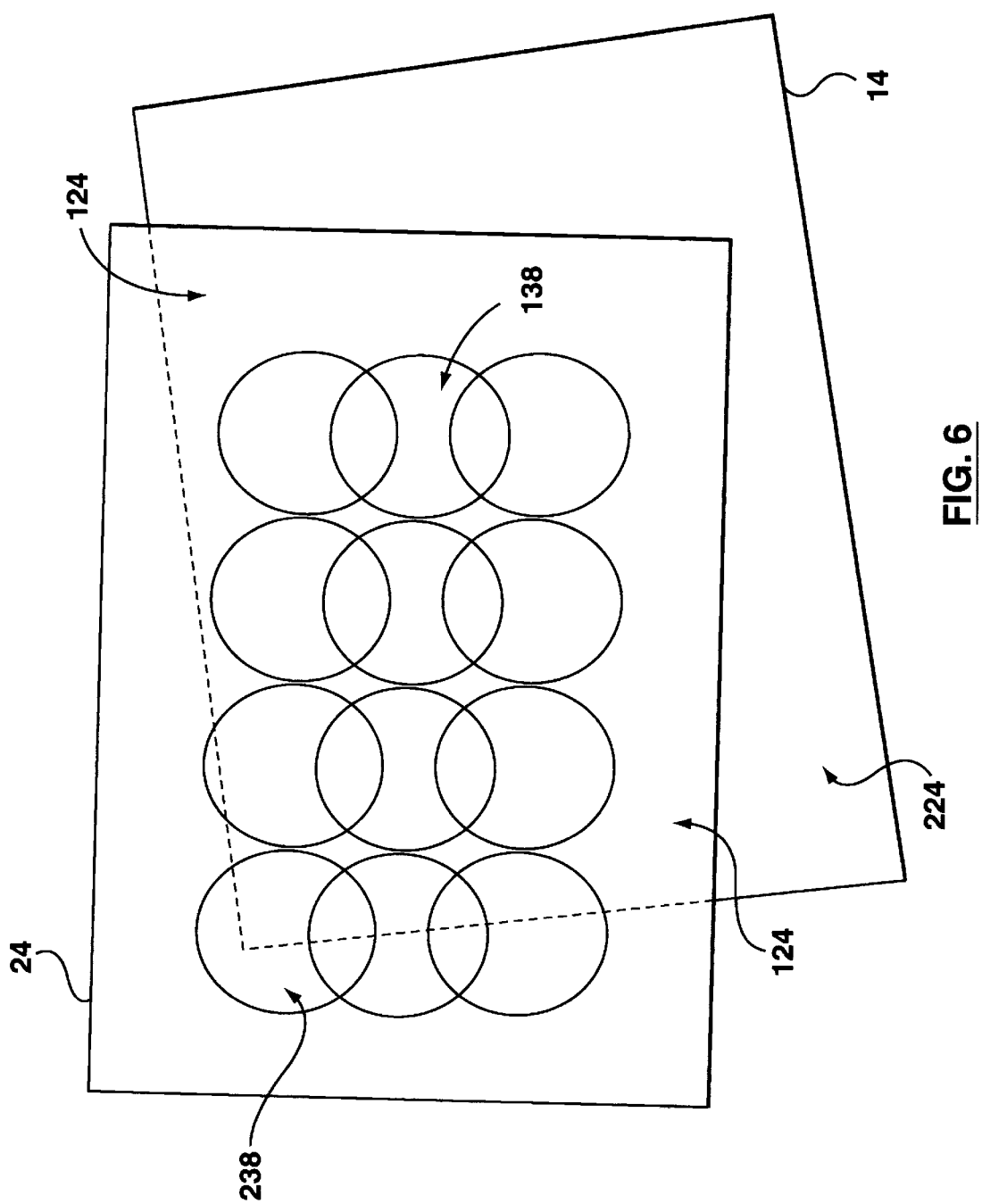

As in all print-analysis systems, comparison will then proceed on the basis of the remaining areas, those areas which coincide, or in other words what may be called the "usable" or "overlapping" data 124 (FIGS. 3 and 6). In the conceptual illustration (FIG. 3), the coarse hatching is only intended to help identify the overlap region 124, not to suggest fingerprint ridges or the like—which of course are much finer.

The above-mentioned dissection consists of dividing up the entire primary data region of the template 24 into a multiplicity of overlapping subregions 138, 238 (FIG. 6)—preferably a set of twelve partially overlapping circles. Of these circles, some 138 are within the common or overlay region 124 and so qualify for use in the analysis to follow.

Thus in "dissecting the overlay area" 50 (FIG. 1) we include those circles 138. Others 238, entirely or (as shown) mainly outside the candidate region 14, we discard as ineligible for inclusion in the final procedure.

Next for each qualifying subregion 238 we compute PSDs for both images, and compare the two PSDs. These PSD comparisons as before yield relative dilation and rotation needed to fit together the two images for each subregion; and based on these we also calculate a relative translation needed for such a best alignment.

Now, each of these distortions for a qualifying subregion 238, considered individually, is in essence taken as isomorphic—but the overall distortion being assessed at this point is assumed to be nonisomorphic (per FIG. 5). Hence it is to be expected that the multiple individual distortions will in general differ from one another.

What we require, however, is a single unitary measure of the degree or extent of overall isomorphic distortion—for comparison with the final threshold 53. This unitary measure we construct as an average of the NSCVs associated with the individual isomorphic distortions for the several qualifying subregions.

Since we know that the candidate image data in some qualifying subregions is noisier—i.e., less reliable—than in others, we form the average as a weighted average 52. In this process the noisier regions are downweighted in proportion to the noise level.

In the Driscoll and Denyer patents, very small data excerpts from template and sample are used in proceeding directly to a final decision for all cases. As pointed out earlier, reliability of such hasty conclusions appears questionable.

In the present invention, by contrast, similarly small amounts of template data 31' have been used, in the global search and isomorphic adjustment, but in very different ways—namely only to obtain a final result in extremely clear cases, or an intermediate result in all other cases. That result is a "once-adjusted" template 24 which is more fairly comparable with the candidate image data 11–14.

All of the overlapping data in this adjusted template 24, which is to say essentially all the overlapping data in the original template 21, are eventually used for stage 3. Furthermore, all of these data are used in comparison with essentially all of the overlapping data 14 from the candidate—i.e., excepting only the data points removed 13' as redundant.

Utilization

Figure 8:
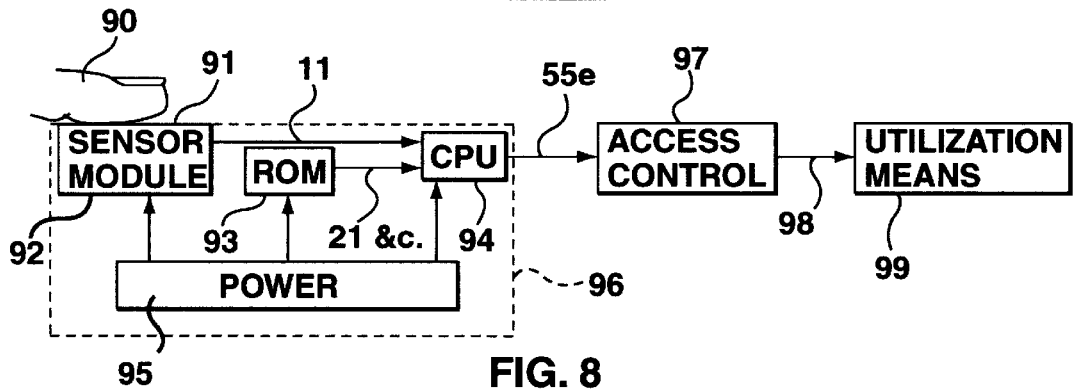
FIG. 8 is an overall block diagram showing the embodiment of our invention in a hardware system.

In operation a candidate user's finger or toe 90—or palm, or any other surface having a comparable skin pattern—is applied to the sensitive surface 91 of a sensor module 92 (FIG. 8). The system may be programmed to start when a skin pattern is thus applied 57 (see FIG. 1, bottom left) to the sensitive surface, or if desired may be provided with a separate start-up switch (not shown).

The sensor module 92 develops an electronic image 11 (see also FIG. 1). The sensor unit 92 advantageously may be an optical detector array—e.g., one of the types described in the Bowker and Lubard patent document mentioned earlier—or may be any other type that yields a suitable candidate-user image data set 11, for instance a capacitive, variable-resistance, or ultrasonic detector.

We prefer to use an optical-fiber prism as described by Bowker and Lubard. In view of the current economics of large sensors and optical-fiber tapers, however, we currently prefer to use a relay lens (rather than such a taper) to focus the image from the output end of that prism onto a small sensor.

Associated with the sensor module is a read-only memory or ROM (or a programmable ROM, EPROM) 93, which holds the authorized user's template 21, 22 (FIG. 1) and associated data 22", 29—as well as the desired-certainty threshold 27 and the a priori statistics 17. (In FIG. 8 these several callouts are abbreviated "21 &c.")

The candidate data 11, template data 21, and related data sets all flow to a programmed or programmable microprocessor or "central processing unit" (CPU) 94. Stored in the ROM 93 or in the CPU 94, or partly in each, is the program described in this patent document.

The portions 91–94 of the apparatus discussed so far—and certain other portions if desired—are advantageously made self-contained and for certain applications also made portable. Accordingly a battery or other portable power supply 95 may be included with the sensor module 92, ROM 93 and CPU 94, and interconnections incorporated, all within a housing 96.

In such a case the output enablement signal 55e (also see FIG. 1) might be the only output from the apparatus. That output passes to access-control module 97, which may include a suitable local or remote switching device for passing an actuation signal 98 to utilization means 99.

The utilization means 99 represent a facility, apparatus, means for providing a financial service, and/or means for providing or receiving information. Merely by way of example, and without any intent to limit the types of these devices which can be controlled in this way, the utilization means may be and/or may include a cabinet, home, office, military or other governmental installation, educational institution, weapon, computer, vehicle ignition and/or entry, automatic teller machine, credit system, time-and-attendance system, or database information service.

As shown the self-contained unit 96 may provide an enablement or decisional signal 55e to a discrete access-control unit 97. In many systems, however, the access-control module 97 is preferably integrated into the self-contained unit 96—in accordance with security-enhancing integration principles described in the aforementioned document of Bowker and Lubard. Similarly the whole of the print-verifying and access-control devices 96, 97 is advantageously integrated into the utilization means 99.

In both cases the general idea of such integration is to make the security aspects of print-verifying control relatively invulnerable to bypassing. That is to say, integration of the whole system can provide resistance to insertion of a jumper, short, or other form of injected simulated access-control signal 98 at the utilization-means 99 input.

Thus for instance in a weapon, bidirectional information flow between the CPU 94 and a detonator 99 within each projectile (bullet etc.) can prevent tampering with the intermediate firing mechanism. In a vehicle that has a distributor or other ignition module 94 directly associated with the combustion system, automatic exchange of information between the CPU 94 and that ignition module can deter bypassing of the security system.

In a credit, time-and-attendance, or information-dispensing database-access system, similarly, the CPU 94 should be programmed to participate in a dialog with the central computer 94 of the credit etc. system. Such a dialog ideally is conditioned to verify not only the identity of the user but also the integrity of the connection between the CPU 94 and the central system.

In view of the foregoing, further examples will now occur to those skilled in the art.

Initial Data Acquisition & Preliminary Processing

Figure 9:
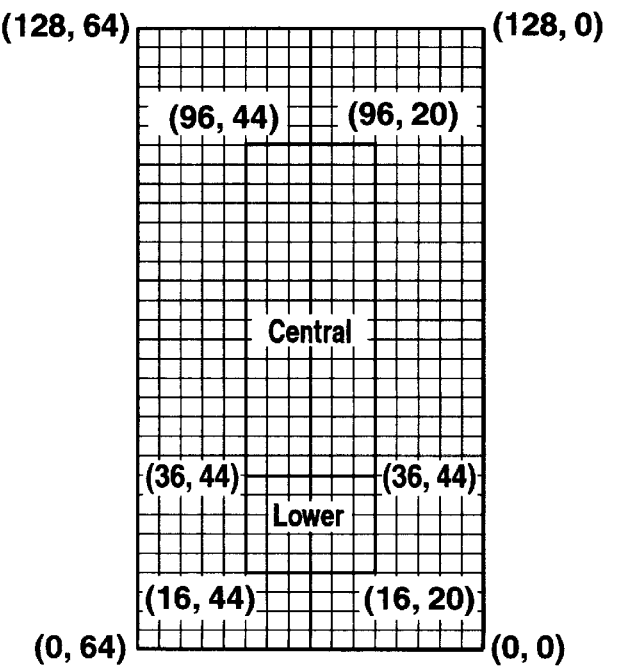
FIG. 9 is a diagram showing search areas in a sensor of the present invention, as used for acquiring the authorized user's template data.
Figure 10:
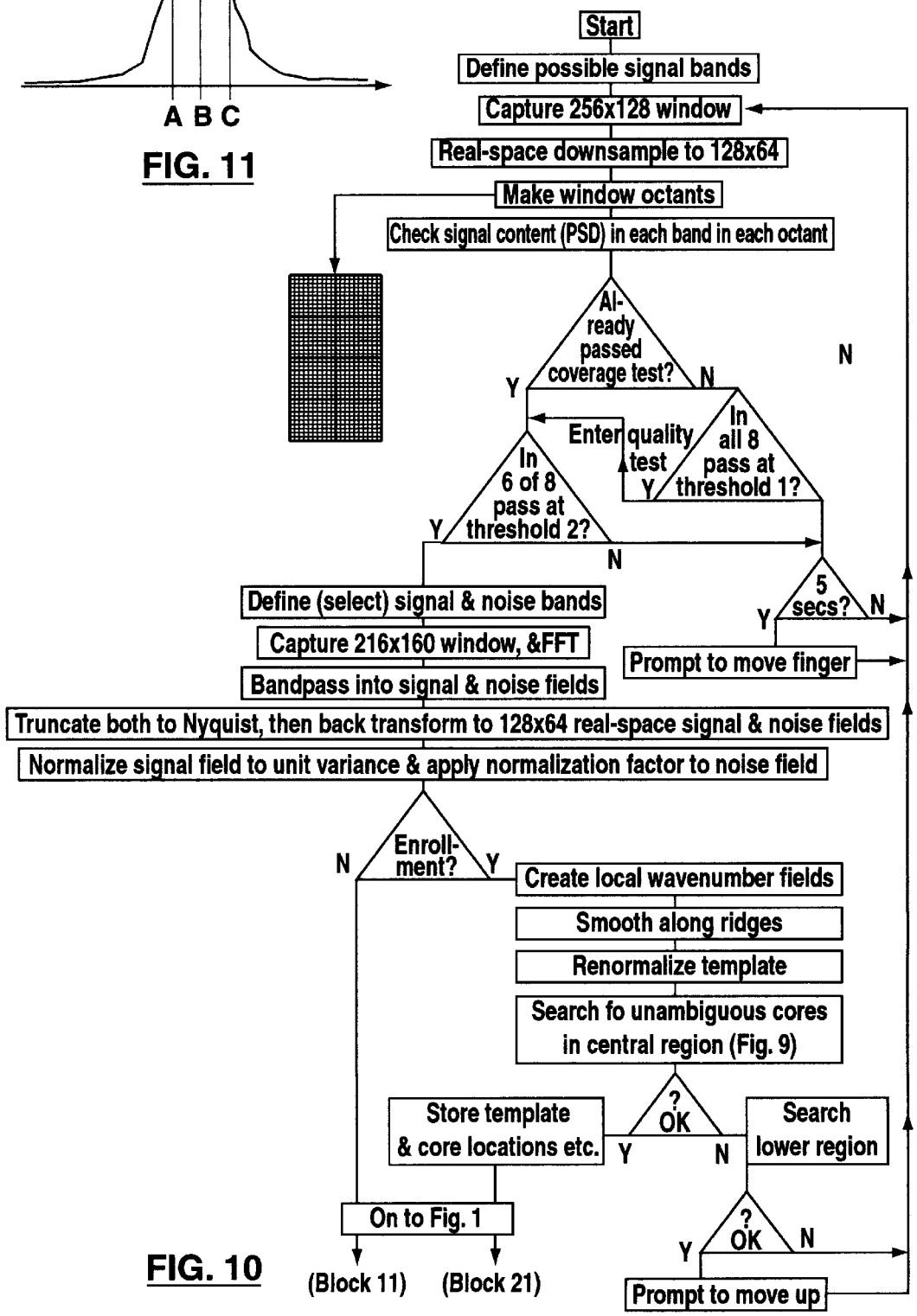
FIG. 10 is a flow chart showing procedures for use in acquiring both authorized and candidate users' data.

Before entering the procedures of FIG. 1, our invention performs several image-acquisition tests for different sensor regions (FIG. 9), and data-premassage steps (FIG. 10). For the most part these will be self explanatory from the accompanying drawings—to a person of ordinary skill in the art, i.e. a senior technician or programmer familiar with fingerprint analyzers and algorithms—but a few comments may be helpful here.

For enrollment of a newly-to-be-authorized user, the initial processing includes seeking adequate signal content in the "Central" (FIG. 9) section of the sensor, but if this is not available then the "Lower" section is tested. If adequate signal energy is found only in the latter region then the user is asked to move the finger "up" (forward along the sensor surface), to center on the sensor those portions of the finger that are providing usable signal data.

This part of the enrollment procedure appears in the flow chart (FIG. 10) at lower right. For candidate users this assistance in ensuring good data quality is omitted, since the authorized user is presumed to have learned during enrollment how to position the fingertip etc. to provide a good image.

The three large test triangles at upper center in the flow chart represent cascaded screenings for coverage first and image-quality next. When the coverage test has not yet been passed, the processing branches into the lower-right triangle, representing a module that tests whether the signal energy in expected spatial wavebands is adequate for all octants of the downsampled image.

If not, the system loops back (along the upward return path along the right edge of the drawing) to the image-capture block, and thus continues for up to five seconds (the smaller test triangle just down and to the right) to snap pictures of the skin-pattern presented. If still no satisfactory image is obtained the user is prompted to try a different finger position—and the processing again loops back to image capture.

Once this all-eight-octant coverage test is satisfied, the routing shifts to the lower-left triangle, representing a module which applies a more stringent threshold but requiring passage for only any six octants. This quality test then proceeds in the same vein as the coverage test, looping through the five-second clock test and the prompt as before.

When eventually the quality test is passed, several data-massage blocks follow, and then processing diverges depending upon whether the skin pattern represents enrollment of an authorized or a verification of a candidate user. In the former case, considerably greater efforts are pursued to define, prepare and store a clean, usable template.

For best results some positions in the candidate print—in other words, some values in the array—are excluded from consideration. The apparatus should not be allowed to select regions that are subject to edge effects, in particular, or any other systematic major corrupting influence. For this reason as may be seen from the Appendix we prepare the data for Fourier transformations by tapering or beveling a few pixels near the edge of the image-data region to be used.

The Fourier-transform procedure itself has alternative versions. In particular, for greatest efficiency, rather than a two-dimensional Fourier transform the invention can calculate two successive transforms of the so-called "Fast Fourier Transform" (FFT) type, one for each of the two dimensions of the candidate print.

The smoothing procedure included in the enrollment section of the flow chart is guided by the inherent directionality of skin-pattern ridges, expressed in the form of "local wavenumber fields" as mentioned earlier. These fields must be carefully prepared to account for the reentrant or whorl-like structures found in most fingerprints and the like.

If not for this reentrant character of most skin patterns of interest, the mathematics of analysis would be far simpler. The typical closed patterns 62 (FIG. 7) and whorls familiar in fingerprints, however, render simple representations inadequate for the following reasons.

In a generally linear region 61 of a print, of course if one could monitor, along a path very generally from ridge 75 to ridge 75', it would be natural to expect continuity of phase-gradient direction 65, 65'—i.e., the direction locally perpendicular to each ridgeline, in which phase increases. By the phrase "continuity of phase-gradient direction" here is meant the property of the direction being consistent, or in other words not reversing (except perhaps where it is near zero).

Such continuity as illustrated by phase-direction arrows 65, 65' near the left end of the drawing, is expected irrespective of the fact that two adjacent, parallel ridges 75, 75' happen to open up into a whorl 62, and as shown even a whorl which includes distinctly closed loops.

The phase-gradient directions 65, 65' for both such adjacent parallel ridges 75, 75'—which happen to span such an enlargement 66—can be traced toward the right along the respective ridges 75, 75'. Eventually a point 72 is reached at which the "two" ridges 75, 75' are found to have been actually different tails of just one common ridge 75–75'.

At some such place along the way, therefore, the initially common phase-gradient directions 65, 65' are found to be directed oppositely 68, 68'. If this phenomenon is not somehow controlled, the entire phase field becomes unmanageably ambiguous as can be seen by tracing the upward-pointing phase arrows 65 around the loop.

Such tracing finds likewise upward-pointing arrows 67 across the top of the whorl 62, rightward pointing arrows 68 along the right end 64 of the pattern, and downward-pointing arrows 69 back across the bottom to the left end 61. Even in this latter region 61 of generally parallel and rectilinear ridges 75, 75' the downward arrows 69 are oppositely directed from not only the upper set of phase arrows 65 above the division line 66 but also the lower set 65'. That lower set, as will be recalled, is associated with the identical ridge line 75' below the division line.

To deal with such potentially troublesome discontinuities, the Thebaud invention forms and maintains several wavenumber vector fields, quadrature forms of those fields, gradient-times-wavenumber product, and various other paraphernalia required to maintain all necessary internal information about the template.

The present invention monitors for phase discontinuities of the sort illustrated, but only once at an early stage of preliminary processing—and can discard all such information as soon as it has completed the process of smoothing along template ridges as mentioned earlier. The monitoring is preferably carried out by detection of sudden reversals in the sign of the wavenumber field 29.

These sign reversals can be found during creation of local wavenumber fields (lower right in FIG. 10), and their locations marked by warning flags 73, 74 a specified distance from each discontinuity 72—in each direction along an axis transverse to the discontinuity. Preferably this work is done during preprocessing, in formation of the template, moving one step at a time in either the x or y direction, in real space—while requiring neighboring values to be substantially continuous, and setting up the flagging in an associated wavenumber field 29.

Figure 7:
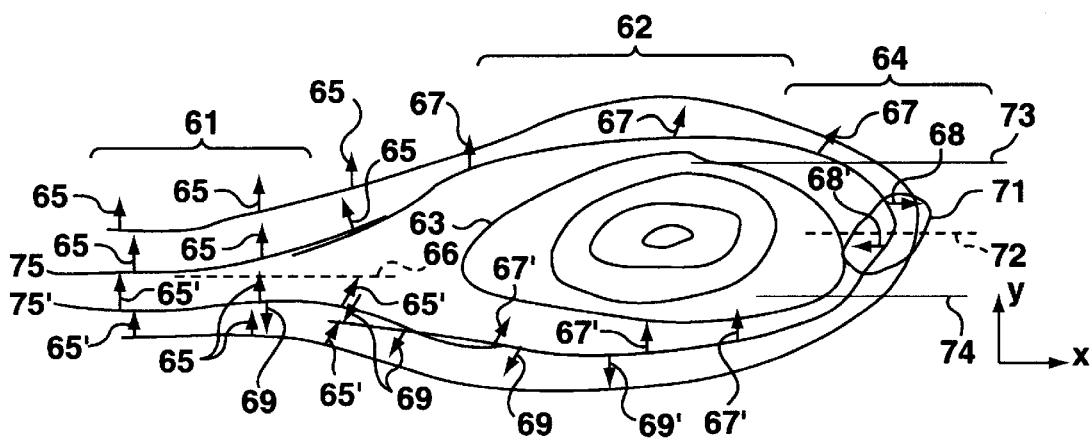
FIG. 7 is a highly enlarged conceptual diagram of a whorl area in a fingerprint, particularly illustrating changes of interridge phase in the area.

In terms of the FIG. 7 example, continuous processing along a vertical (y) direction locates the discontinuity 71 at a height 72 in the pattern.

Then in smoothing the system watches for the flags 73, 74 only at right angles to the direction y selected previously for imposition of continuity. This strategy enables the processing to stay some distance away from a discontinuity.

As mentioned earlier, many realizations of skin patterns are subject to distortions which amount, locally, to more than a half wavelength or even one or more full wavelengths in the pattern. If such a distortion is allowed to develop too rapidly, the only portion of it which is in effect "visible" is the fractional part remaining after deduction of an integral number of wavelengths.

It is essential to realize that correlation goes to zero in any region of the template that is misaligned by only a quarter of a wavelength. Hence, avoiding errors of a half wavelength, or of course anything larger than that, is of extremely great importance to successful practice of our invention— at least in those cases where sizable distortions are in fact present.

Scaling of the steps to avoid falling into such ambiguities is preferably achieved by limiting the algorithm's rate of stepping.

Moving or Storing Data

Storage of templates in abstracted or abbreviated form (e.g., level-downsampled to two-bit or binary data) does require care to avoid loss of ultimate performance. Storage need not impair accuracy if the data are properly processed after retrieval.

In particular, routine template-data steps of bandpassing, normalizing and smoothing should be performed both before downsampling and afterward upon retrieval of the abstracted data to as nearly as feasible reconstitute the original information set. These steps respectively ensure that what is about to be stored is properly representative of the data before storage or transmission, and later beat down the high frequencies introduced by storage in one- or two-bit form.

Figure 11:
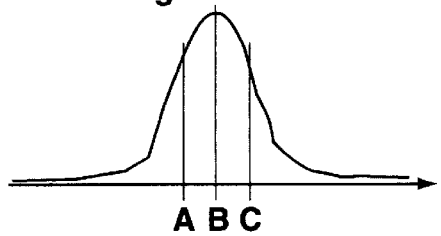
FIG. 11 is a darkness-level (or brightness-level) diagram conveying data compression used for storage of the template data.

The downsampling of levels is preferably performed on the basis of statistical distribution in the data, for example based on unit variances as suggested for four levels in FIG. 11, rather than arbitrarily on the basis of initial signal levels. As the drawing suggests, this preferred process of discriminating between levels will result in use of rather high set points, as well as an algebraic sign—but with the advantage that discriminations are thereby introduced which distinguish between levels among those data points that are the most important. A like schema will now be clear if for instance an eight-level system is desired.

It will be understood that the foregoing disclosure, and that of the following Appendix, are intended to be merely exemplary, and not to limit the scope of the invention—which is to be determined by reference to the appended claims.

APPENDIX

This describes the skin-pattern print (e.g., fingerprint) verification algorithm that operates in preferred embodiments of the present invention. This material is included, though perhaps in an excess of caution, to ensure satisfaction of the obligation of full enabling disclosure, including that of the best mode of practice of the invention.

Whereas the body of the foregoing patent disclosure is intended as a complete conceptual presentation, this Appendix provides all additional information necessary for a person of ordinary skill in the art—namely, a senior programmer or programming technician experienced in the field of fingerprint analysis using higher mathematics—to prepare firmware needed for successful practice of the invention. Other hardware aspects of the invention are taught at a like level of detail in the Bowker et al. patent documents mentioned in the disclosure text.

A summary of the processing steps appears first. In the sections that follow, the algorithm is broken down into components which are described in detail.

The major components of the algorithm are Fingerprint Acquisition and Preparation, Enrollment, and Verification. Acquisition and preparation involve image capture, digitization and filtering the image to enhance ridge contrast. Enrollment is the process of entering a new authorized user into the system; normally this is only done once per authorized user, and is performed by a trained operator or technician. Verification is the process of matching a candidate user's fingerprint to the stored information about that candidate. "Enrollment," "Verification," and other terms are defined in the glossary at the end of this Appendix.

Minutia-based algorithms are susceptible to errors due to the presence of scarring over time, or to dirty fingers that produce false minutia points or hide true minutia points. The invention exhibits robust performance in these scenarios.
Processing The software waits in a dormant state until action is required. This action is requested by either a command from the unit to perform enrollment or verification, or a command from a network controller. The first step in the processing is image acquisition. A fiber-optic prism, through a process called frustrated internal reflection, provides an image of the fingerprint to a CCD camera. This image is digitized and placed in memory for the software to read.

The software repeatedly reads a subsection of the fingerprint area until the image subsection passes two tests. An image coverage test verifies that the fingerprint image is relatively centered in the optics. An image quality test requires significant ridge contrast in the data collection window. When these tests are passed, a new similarly sized central sub-section of the image is downsampled to 128 by 64 pixels (referred to as the b-grid) and filtered to generate signal and noise fields. The signal field is normalized to unit variance and the noise field is adjusted accordingly.

Enrollment processing uses the normalized signal field exclusively. The field is smoothed along the ridges, and a search is conducted for "cores" (see glossary for definition) in a central region. The ambiguity statistic of each core is analyzed, and for the image to be considered useful, the least ambiguous core's statistic must not exceed a threshold. If the image is considered useful, then it is stored as a template with its related information. If the image is not useful, the algorithm searches a lower region (below the central region previously used) for cores. If, in this region, the least ambiguous core's statistic is lower than the threshold, the user is prompted to move their finger forward on the platen and a new image is acquired. Otherwise, the user is informed that enrollment has failed and the unit waits for further commands.

Verification processing is more complicated. After the image has been acquired and prepared, a global search procedure is initiated for each core in turn. The purpose of the global search is to find a good estimate of the large scale rotation and dilation between the candidate fingerprint and the stored template information with respect to each of the cores. Next, an estimate of the translation between the two images with respect to each core is made by rotating and dilating the template about each core according to the estimates. The peak correlation as a function of position between the candidate and the manipulated template is identified for each core. The position corresponding to this peak represents the best estimate of translation with respect to the core being examined. The magnitude of this correlation is a measure of the match between the two images. Based on the magnitude of the correlation of the best-matched core, a "stage 1" decision is made (Pass/Fail/Maybe).

If the answer is Maybe, "stage 2" is entered. Stage 2 processing is similar to stage 1 with the main exception that the processing window is smaller. A conditional decision, similar to stage 1, is also made at the end of this stage.

If again the decision is Maybe, "stage 3" is entered. In stage 3, the candidate fingerprint is rotated/dilated/translated to align with the template. The central region of the template is divided into twelve overlapping circular regions. At this point, the candidate and template have a region of overlap. Only the circular regions that lie within the overlap of the manipulated candidate and the unmanipulated template contribute to the stage 3 statistic. An optimal rotation, dilation and translation is calculated for each subregion. Each rotated/dilated/translated template sub-region is correlated to the corresponding candidate sub-region. These correlations are weighted and averaged, producing a test statistic that is used to make a final decision (Pass or Fail).

Fingerprint Acquisition and Preparation

I. Preprocessing (Verifying the Overall Image Quality)

A. Define an input "mean ridge spacing" wavenumber $k_0$, then define the following five signal bands to allow for various mean ridge spacings in the fingerprint population:

$$\frac{k}{1.4 \cdot \sqrt{1.5}} < |\bar{k}| < \frac{k_0 \cdot \sqrt{1.5}}{1.4}$$

$$\frac{k}{1.2 \cdot \sqrt{1.5}} < |\bar{k}| < \frac{k_0 \cdot \sqrt{1.5}}{1.2}$$

$$\frac{k_0}{\sqrt{1.5}} < |\vec{k}| < k_0 \cdot \sqrt{1.5}$$

$$\frac{k_0 \cdot 1.2}{\sqrt{1.5}} < |\vec{k}| < k_0 \cdot 1.2 \cdot \sqrt{1.5} \quad \frac{k_0 \cdot 1.4}{\sqrt{1.5}} < |\vec{k}| < k_0 \cdot 1.4 \cdot \sqrt{1.5}$$

B. Capture a fingerprint image, then excise the central region of the fingerprint (about 1.6×1.25 inches currently for efficiency). Real-space downsample this image to the b-grid for FFT processing.
C. Divide up the b-grid window of data into eight equal octants, then FFT each octant separately. Multiply each transformed field by its complex conjugate to get the power spectral density (PSD).
D. For each of the eight subwindows, form a sum of the magnitudes of the frequencies that lie in each signal band. Pick the signal band that corresponds to the maximal sum of the five sums generated for each subwindow.
E. Perform the finger coverage test according to the following steps:
  1. The maximal sum must exceed a set threshold co in all eight subwindows in order for the fingerprint to be deemed as adequately covering the image platen.
  2. If the image does not pass this test, then a new image is collected as described in (B) through (D) and the test is performed again on the new image. This process will continue for five seconds or until an image is deemed adequate, whichever comes first, with the idea being that finger placement may be adjusted during this time. If the test fails after five seconds, then the user is prompted to retry placing the finger onto the platen. If it passes, then the algorithm continues on to the quality test.
F. Perform the print quality test according to the following steps:
  1. Collect a new image as described in (B) through (D).
  2. This time the maximal sum for a signal band of energy in a given subwindow must exceed a threshold $q_o > c_0$. If it does, then the subwindow of the image is considered to have adequate image quality.
  3. Six of eight subwindows must be considered as adequate in quality in order to declare the fingerprint image as adequate for further processing. If the image is not adequate, the process repeats in the same way as described in (E.2) for five seconds, this time with the rationale that fingerprint quality will improve over time as the finger rests on the imaging platelet. If the test fails after five seconds, then the user is prompted to retry placing the finger onto the platen. If it passes, then the algorithm continues on to raw processing.

II. Raw Processing (Preparing a Fingerprint Image for Enrollment or Candidate Processing)
A. Define the following signal and noise bands, which are currently:

$$\frac{k_0}{\sqrt{2.6}} < |\vec{k}| < k_0 \cdot \sqrt{2.6} \quad \text{(signal)}$$

$$\frac{k_0}{\sqrt{6}} < |\vec{k}| < \frac{k_0}{\sqrt{2.6}} \quad k_0 \cdot \sqrt{2.6} < |\vec{k}| < k_0 \cdot \sqrt{6} \quad \text{(noise)}$$

B. Using the image that passed the pre-processing tests, excise the center region (currently 2.0×1.0 cm) of the fingerprint. FFT this window of data.
C. Apply the signal bandpass to the transformed data, truncate data to Nyquist in frequency space, then back-transform to get the signal field $m_1(\vec{r})$ on the b-grid.
D. Perform step (C) in the noise band to generate the noise field $m_2(\vec{r})$ on the b-grid.
Note that no 1/N factor is included because normalization will occur later.
E. Define a smoothing operation as equivalent to a real-space smoother with positive weights (i.e. not a bandpass or lowpass filter). For each of the two bandpassed fields, form $$\overline{m_i^2}.$$

as the smoothed square of the data (with independent parameter choices).
Define $(\Delta^2 \overline{k})_i$ as the bandwidth areas for the two bands. Construct an estimate of the signal variance as $$\sigma_s^2 = \overline{m_i^2} \left\{ \epsilon + \frac{1}{\sum_{i=0}^{n-1}(R+\epsilon)^i} \right\}$$

where the field R is defined by $$R = \frac{(\Delta^2 \overline{k})_1}{(\Delta^2 \overline{k})_2} \cdot \frac{\overline{m_2^2}}{\overline{m_1^2}}$$

and $\epsilon$ is a small positive parameter that functions as a soft limiter in case R>1 (R should obey R<1, but is not mathematically required to do so). If the integer parameter is chosen as a power of two, then the summation can be performed iteratively, with an advantage in efficiency.
F. Normalize the signal field to unit variance, and create the inverse noise field, by outputting the following fields:

$$m_1(\vec{r}) = \frac{m_1(\vec{r})}{\sigma_s(\vec{r})} \quad \text{(normalized signal field)}$$

These fields will be used in the rest of either enrollment or verification processing.

$$P_n^{-1}(\vec{r}) = \frac{(\Delta^2 \overline{k})_2}{\overline{m_2^2}} \cdot \sigma_2^2(\vec{r}) \quad \text{(inverse noise field)}$$

Enrollment Processing
I. The first step in enrollment processing is acquire the fingerprint image and perform the data preparation that is described above in "FINGERPRINT ACQUISITION AND PREPARATION".
II. Once the image (defined here as $m'(\vec{r})$ is available for processing, the vector wavenumber field, $\vec{k}(\vec{r})$ is generated. This is done in a multiple step process. First the gradient of the image, $\vec{\nabla} m'(\vec{r})$, is generated by performing an FFT on the b-grid data, multiplying by $-\vec{i} q$ in Fourier space, and performing the inverse FFT.
A. Then the smoothed-dyadic 2×2 covariance matrix, $C(\vec{r})$, is calculated as $$(\vec{r}) = \overline{\vec{\nabla} m' \vec{\nabla} m'}$$

where the smoothing is the same as applied to the data in the preparation step. Finally, we calculate $\vec{k}(\vec{r})$ from $C(\vec{r})$ as follows: The magnitude of $\vec{k}(\vec{r})$ is given by $$|\vec{k}| = \sqrt{C_{xx} + C_{yy}}.$$

B. Then, a complex field, $Z(\vec{r})$ is defined as $$Z(\vec{r}) \equiv C_{xx} - C_{yy} + 2C_{xy}i.$$

This field is used to generate the phase of $\vec{k}(\vec{r})$, $\theta_k$, as follows:
1. Start at the end of the b-grid farthest from the core. Beginning at one corner, define $$\theta_k = \frac{1}{2}\text{phase}(Z).$$

2. Now march to the other corner at the same end by updating $\theta_k$ via $$\Delta\theta_k = \frac{1}{2}\text{phase of }(ZZ'*)$$

where Z' represents the previous data point. Now march away from the end in the same manner (in a direction perpendicular to that end). The result is the α=1 version of $\vec{k}(\vec{r})$. Generate the α=2 version by repeating this procedure with the dimensions reversed.
3. For each wavenumber map, march in the direction parallel to the original end and detect angle jumps exceeding p/2. At these locations, and for some distance (input) around them, set a 1-bit flag field to unity. (This field will always be associated with $\vec{k}^{(\alpha)}$.)

C. Now we smooth the fingerprint image, $m'(\vec{r})$, along ridges (i.e. along loci perpendicular to $\vec{k}(\vec{r})$). Use nearest-neighbor mapping and a step size in arc length equal to b-grid resolution, $\Delta x_b$. Call the smoothed result $m'_s(\vec{r})$. Now normalize this ridge-smoothed template by the RMS $$S'_0(\vec{r}) = m'_s(\vec{r}) \left[ \overline{(m'_s(\vec{r}))^2} \right]^{1/2}.$$

D. The next step is to find a predetermined number of "core" regions. This is done by means of what is called an "automated core finder." First a central region (see FIG. 1) is is searched for acceptable cores, that is cores with an ambiguity less than the defined threshold (currently set at 0.40). If no acceptable cores are found in the central region, a lower region is searched for a single good core. If a good core is found in the lower region then the user is prompted to move the finger up on the platen and processing jumps back to Image Acquisition (see "FINGERPRINT ACQUISITION AND PREPARATION"). If not, the user is informed that Enrollment has failed and processing jumps back to Image Acquisition.

E. The automated core finder has been implemented as follows:
1. Define a coarse sampling of trial core locations in the template image staying a specified distance from the edges. For each trial location, determine a figure of merit as follows.
2. Calculate the lagged cross-covariance between the ridge-smoothed template $S'_0$ windowed about the trial location (with a specified circular window) and the full template. This is done by taking the FFT of the $S'_0$ and its windowed counterpart. The fields are then multiplied together and the result is inverse FFT'd to yield the lagged cross-variance. Normalize by window area so that the cross-covariance is ideally unity at zero (vector) lag. Compute the maximum of this field over lags with magnitude exceeding a specified amount (nominally, at least one-half ridge). This is an estimate of the degree of ambiguity for this trial core location.
3. Now choose a core location, or possibly a multiplicity of locations, as follows:
    a. The location with minimum ambiguity is chosen and labeled number 1.
    b. If more than one core is desired, all core locations within a specified distance of this core (nominally one core radius) are now excluded, and the minimum ambiguity remaining location is designated the second core.
    c. The same procedure, excluding locations close to the first two cores, results in a third core, and so on.

F. The template is truncated to N bits of dynamic range (where N is currently equal to two) and compressed for minimum storage requirements The process of compressing the fingerprint image for template storage involves multiple steps.
1. The data are quantized to two bits (four gray levels)
    a. Histogram equalize the data—define four ranges within the range of the data, each to be equated with a gray level.
        1. Find the median of the data (equal numbers of data points on either side of the median value).
        2. Determine values for two other thresholds that are equivalent to the medians of each of the two populations (one on either side of the data median). FIG. 11 shows the histogram of the data and the three defined thresholds A, B, and C.
    b. Use the defined thresholds to transform the data to a two-bit version of itself by assigning either a 0, 1, 2, or 3 to the value depending on which section of the histogram the data originally occupied.
2. Perform a shift (by two bits) and add for groups of four values, thus packing the two-bit data into eight-bit bytes.
3. Apply a standard compression technique to the resulting data (to be determined). At this point the template (compressed image and related information) can be stored in internal memory, reported to a central controller, or saved to external memory.

G. The final step of the enrollment process is to store the template for future use in the verification process. The template storage format is currently defined as a header and a variable number of bytes for the compressed template data. The header information consists of:

Template Version Number

Personal ID Number (PIN)—used to reference the template

Thresholds defined to quantize the data

For each core being generated and saved:

X location

Y location

Ambiguity Factor—calculated in the automated core finder

Size of the compressed template data

Reserved words—for future expansion

H. It is possible that more header information will be required in the future, but these changes will be comprehended by the software through the template version number.

Verification Processing

I. Verification processing requires a template to test against. This is typically retrieved when the user enters his/her personal identification number (PIN).
A. The PIN is used to reference a stored template in memory.
B. The template is made up of a compressed fingerprint image and its related information. The compressed fingerprint information must be decompressed and filtered before it can be used in the verification process.
C. Decompression of the data is the reverse process of storing the template (see Enrollment Processing).
   1. First the data decompression is applied that will retrieve the packed, two-bit template information.
   2. The packed, two-bit template is unpacked by converting eight-bit bytes into four two-bit values. These are in turn converted to floating-point values using the thresholds defined in Enrollment Processing.
D. The data are still in a pseudoquantized form, and is not suitable for processing. The data are bandpass filtered in a manner similar to the Signal band filter defined for the candidate fingerprint.

II. Acquire fingerprint as per Fingerprint Acquisition and Preparation. This will be our "candidate" print.

III. Overview of the global search procedure:
A. Make some working copies of the template and candidate fields for the following steps. The copies of the candidate field are modestly tapered to avoid aliasing.
B. Define a circular window of a given size about one of the template's core locations by zeroing the b-grid data outside of the template window.
C. Using a spatial correlation of the window with the whole candidate field, find the closest corresponding region of the candidate.
D. Define the corresponding window of the candidate as in (A).
E. Determine the optimum rotation and dilation to apply to the template window in order to match the corresponding candidate window most closely. This is done by the following:
   1. FFT the b-grid template and candidate windowed data fields, then truncate to Nyquist. Generate the corresponding PSDs, which are in the shape of a half-annulus.
   2. Remap the PSDs from their XY coordinates to polar coordinates, so they are now rectangular. Now, each new pixel in the b-grid corresponds to the signal energy at a particular radius and angle in the spatial window region.
   3. Correlate these two new fields in the hypothesis range (currently) of −18° to 18° of rotation and ±10% of dilation to find the best rotation/dilation value for the template window region.
F. Using the rotation/dilation values from (E), rotate and dilate the template field with respect to the core location using a real-space rotation and dilation procedure with bilinear interpolation.
G. Window again about the remapped template's core location.

H. Repeat step (C), assuming that the rotated/dilated window may correspond to a slightly different location in the candidate because of its new orientation. The goal is to obtain a better estimate of the global translations than those obtained from (C).
I. The outputs from these steps include an estimation of the best global rotation/dilation/translation of the template with respect to one of its cores in order to globally align the template and candidate. Also included is the normalized correlation value from step (H), i.e., the value of the correlation field at the optimum translation. Define this value as $L_o$.

IV. Stage 1
A. Perform (II) for all three cores of the template using a relatively large window size for the circular windows (currently the window radius is twenty-four pixels).
B. Save the rotation/dilation/translation values for the core that gave the maximum (of the three) $L_o$ value from step (II.H). Define this value as $L_{MAX}$.
C. Make a pass/fail/maybe decision for the candidate based upon the following formulas:

$$L_{MAX} > \gamma_{PASS} \quad \text{(pass)}$$

$$L_{MAX} < \gamma_{fail} \quad \text{(fail)}$$

$$\gamma_{fail} < L_{MAX} < \gamma_{PASS} \quad \text{(maybe)}$$

D. If the decision is "maybe" at this point of processing, then continue to Stage II.

V. Stage 2
A. Perform (II) for all three cores of the template with the following details
   1. Use a smaller window size than in (III.A) (currently the window radius is 18 pixels). This may give a better estimation of the global rotation/dilation/translation values for a given window region in case the larger window contained too much image distortion relative to the corresponding candidate region.
   2. Omit step (II.C). For step (D) simply use the translation values associated with the Stage 1 $L_{MAX}$. The values are to be directly used for the one core associated with $L_{MAX}$, otherwise for the other two cores they should be modified to account for the Stage 1 $L_{MAX}$ rotation/dilation values not being identically 0° rotation and 0% dilation.
B. Generate a new $L_{MAX}$ value for this stage.
C. Make a Pass/Fail/Maybe decision for the candidate based upon the following formulas:

$$L_{MAX} > \gamma_{PASS} + \epsilon_{pass} \quad \text{(pass)}$$

$$L_{MAX} < \gamma_{fail} + \epsilon_{fail} \quad \text{(fail)}$$

$$\gamma_{fail} + \epsilon_{fail} < L_{MAX} < \gamma_{PASS} + \epsilon_{pass} \quad \text{(maybe)}$$

Note that the reason for the elevated thresholds is because of the smaller window size used in Stage 2.

D. If the decision is "maybe" at this point of processing, then continue to Stage 3.

VI. Stage 3
A. Rotate/Dilate/Translate the tapered candidate image according to the appropriate inverse values of the best values from Stage 2 processing. Zero-pad any data in the b-grid array that no longer contains the candidate print.
B. Divide the center region of the template into overlapping circular subregions. Currently we are using a 112×48 region divided into twelve windows of radius eleven pixels each.

C. For each template subregion, check if a considerable percentage of the subregion corresponds to remaining candidate data (as opposed to mostly being aligned in the zero-pad region).
D. If a template subregion qualifies as viable for comparison (see FIG. 6), do the following orientation procedure:
   1. Generate various rotation/dilation hypotheses for the template subregion. This is done by real-space rotation and dilation (with bilinear interpolation) of the subregion. The allowable rotations/dilations for the subregion are relatively small because small variations are allowed between a globally re-oriented candidate and the template.
   2. Correlate each of the hypotheses with the corresponding candidate subregion.
   3. Choose the best rotation/dilation hypothesis for the template subregion, and rotate/dilate it by that amount.
   4. Spatially correlate the newly oriented template subregion with the corresponding candidate subregion, allowing for only small translational shifts between the two regions.
   5. Save the final normalized correlation value associated with the optimum translation. For the $i^{th}$ subregion denote this value as $L_i$.
E. After checking all of the template subregions, and processing through the qualifying ones, form a weighted average of the $L_i$ values according to the following:

$$\frac{\sum_{i \in qualified \, i} L_i^2 \cdot P_n^{-1}(\text{center pixel of sub-region } i)}{\sum_{i \in qualified \, i} P_n^{-1}(\text{center pixel of sub-region } i)}$$

Note that the $L_i$ values are squared to boost the spread between low and high values of $L_i$. Also note that the inverse noise value for the candidate (assumed to be relatively constant over the subregion) is applied to downweight the contributions of subregions associated with high noise, because it is assumed that the general signal quality of these regions is poorer than in the rest of the print.
F. A yes/no decision is made based on the $L_{NEWMAX}$ statistic.

$L_{NEWMAX} > \gamma_{final}$ (pass)

$L_{NEWMAX} < \gamma_{final}$ (fail)

Glossary a-grid—The raw fingerprint image is digitized as 329 by 242 pixels and written to memory. The software reads in a subsection of this that is 256×128 pixels in size during image acquisition, and is 216×160 pixels in image preparation.

b-grid—The b-grid is currently 128 by 64 pixels. In image acquisition, this is achieved by performing a real-space downsample on the a-grid. In image preparation, the b-grid is achieved by transforming the a-grid image, truncating at Nyquist, then inverse transforming.

Core—A region of the fingerprint image (calculated on the template) that is relatively distinctive, or more conspicuously unique, compared to all other regions in the image. Distinctiveness is quantified by a lagged cross-correlation between the image and a tapered version of the image.

Enrollment—The process of entering a person's fingerprint into the stored memory of the system. The information can be stored in the device or in a centralized area. This information will be used to verify a candidate fingerprint, and therefore, this procedure should be conducted by a trained operator for best results.

Verification—The process of determining the authenticity of 12 a person's identity by means of matching their fingerprint to the stored information collected during enrollment. The accuracy of authenticating a user's identity is directly related to the quality of the stored template information.

Template—The ridge-smoothed fingerprint image and its associated information make up the template. This information is generated during enrollment, and used during verification.

Ambiguity—This term refers to the distinctiveness of the core region relative to other areas of the fingerprint image. In finding cores, one desires a very low degree of ambiguity (i.e., highly distinctive, or more plainly unique).

Candidate—This is the fingerprint image that is presented to the unit during verification processing.

What is claimed is:

1. Apparatus for verifying the identity of a person by comparing test data representing a two-dimensional test image of that person's skin-pattern print with reference data derived from one or more two-dimensional reference skin-pattern print images obtained during a prior enrollment procedure; said apparatus being for use in the presence of an assumed dilation of the test image relative to the reference image; said apparatus comprising:

means for computing power spectral density of at least a portion of the test image;

means for applying the power spectral density to estimate dilation of the test image relative to a reference image;

means for comparing the test data with the reference data, taking into account the estimated dilation;

means, responsive to the comparing means, for making an identity-verification decision; and nonvolatile memory means for holding instructions for automatic operation of the foregoing means.

2. The apparatus of claim 1, wherein:

the computing means further comprise means for computing power spectral density of at least a portion of the reference image; and the applying means comprise means for comparing the power spectral densities of the test image and reference image to estimate their relative dilation.

3. The apparatus of claim 2, wherein:

the applying means comprise means for interpreting a radial component of power spectral density as a measure of relative dilation.

4. The apparatus of claim 1, wherein:

said applying means further comprise means for applying the power spectral density to estimate rotation of the test image; and the comparing means further comprise means for taking into account the estimated relative rotation.

5. The apparatus of claim 4, wherein:

the applying means comprise means for interpreting an angular component of power spectral density as a measure of rotation.

6. The apparatus of claim 3, further comprising:

means for applying the estimated relative dilation and rotation to further estimate relative translation of the reference and test images.

7. The apparatus of claim 1, further comprising:

means for estimating relative rotation of the reference and test images; and means for applying the estimated relative dilation and rotation to further estimate relative translation of the reference and test images.

8. Apparatus for verifying the identity of a person by comparing test data representing a two-dimensional test image of that person's skin-pattern print with reference data derived from one or more two-dimensional reference skin-pattern print images obtained during a prior enrollment procedure; said apparatus being for use in the presence of an assumed rotation of the test image relative to the reference image; said apparatus comprising:

means for computing power spectral density of at least a portion of the test image;

means for applying the power spectral density to estimate rotation of the test image relative to a reference image;

means for comparing the test data with the reference data, taking into account the estimated rotation;

means, responsive to the comparing means, for making an identity-verification decision; and nonvolatile memory means for holding instructions for automatic operation of the foregoing means.

9. The apparatus of claim 8, wherein:

the computing means further comprise means for computing power spectral density of at least a portion of the reference image; and the applying means comprise means for comparing the power spectral densities of the test image and reference image to estimate their relative rotation.

10. The apparatus of claim 9, wherein:

the applying means comprise means for interpreting an angular component of power spectral density as a measure of rotation.

11. Apparatus for verifying the identity of a person by comparing test data representing a two-dimensional test image of that person's skin-pattern print with reference data derived from one or more two-dimensional reference skin-pattern print images obtained during a prior enrollment procedure; said apparatus being for use in the presence of an assumed rotation and dilation of the test image relative to the reference image; said apparatus comprising:

means for computing power spectral density of at least a portion of such test image and of such reference image, respectively;

means for transforming the respective computed power spectral densities to polar coordinates;

whereby the transformed power-spectral-density information interpreted as rectangular-coordinate data has the form of power-density values plotted on a rectangular grid of ridge spacing and orientation;

means for considering the transformed power spectral densities for such test and reference images together, and reading off from said considered-together power spectral densities an estimate of relative rotation and dilation; and nonvolatile memory means for holding instructions for automatic operation of the foregoing means.

12. The apparatus of claim 11, wherein:

the considering means comprise means for ratioing the respective ridge-spacing and orientation values, or correlating the two transformed power spectral densities, within a hypothesis range of relative rotation and dilation to find an estimate of the most probable relative rotation and dilation.

13. Apparatus for verifying the identity of a person by comparing test data representing a two-dimensional test image of that person's skin-pattern print with reference data derived from a two-dimensional reference skin-pattern print image obtained during a prior enrollment procedure; said apparatus being for use in the presence of an assumed distortion of the test image relative to the reference image; and said apparatus comprising:

means for estimating relative translation, and at least one component of relative isomorphic distortion, between the test and reference images;

means for adjusting the test or reference image, or both, to allow for said estimated relative translation and component of relative isomorphic distortion;

means for comparing said test and reference images, after said adjustment, within substantially all area that is common to both images, to make an identity-verification decision;

wherein the comparing means comprise means for analyzing power spectral densities within said common area to estimate remaining distortion; and nonvolatile memory means for holding instructions for automatic operation of the foregoing means.

14. The apparatus of claim 13, wherein the comparing means comprise:

means for dividing one of the images into a multiplicity of substantially overlapping subregions that in the aggregate cover substantially the entire said one image; and means for evaluating the degree of similarity of said test and reference images, with respect to substantially every one of said subregions of which a significant fraction is within said all area common to both images.

15. The apparatus of claim 14, wherein the evaluating means comprise:

means for estimating, within each of said subregions in said common area respectively, a further component of relative distortion between test and reference images.

16. The apparatus of claim 15, wherein the evaluating means further comprise:

means for forming a composite measure of said further components for all of said subregions in the common area; and means for thresholding said composite measure to make said decision.

17. The apparatus of claim 16:

further comprising means for extracting from the test data an estimate of noise variance in the test data as a function of position in the test image; and wherein the composite-measure forming means comprise means for taking into account the estimated noise variance.

18. The apparatus of claim 17, wherein the taking-into-account means comprise:

means for weighting the further component for each of said subregions in the common area, in an inverse relation with the noise-variance estimate for that subregion.

19. Apparatus for receiving surface-relief data from a sensor that acquires surface-relief data from a relieved surface such as a finger, and in response controlling access to facilities, equipment, a financial service, or a system for providing or receiving information; said apparatus being for use in presence of an assumed dilation of the surface, and comprising:

a system for processing the received data to determine identity of the relieved surface, said system including:

means for calculating and comparing power spectral densities of at least a portion of the received data and test data respectively, and analyzing the power spectral density comparison to estimate dilation, means for comparing the test data with referencedata, taking into account the estimated dilation, and means, responsive to the comparing means, for making an identity-verification decision;

means for applying the determined identity to control access to such facilities, equipment, financial service, or source or reception of information; and nonvolatile memory means for holding instructions for automatic operation of the foregoing means.

20. A secured system subject to access control based upon surface-relief data from a relieved surface such as a finger; said system being for use in the presence of an assumed distortion of the relieved surface; and said system comprising:

utilization means, susceptible to misuse in the absence of a particular such relieved surface that is related to an authorized user, said utilization means being selected from the group consisting of:
a facility,
apparatus,
means for providing a financial service, and
means for providing or receiving information;

sensor means for acquiring surface-relief data from such a relieved surface;

means for processing the data to determine identity of the relieved surface, and for applying the determined identity to control access to the utilization means, said processing and applying means including:

means for calculating and comparing power spectral densities of at least a portion of the received data and test data respectively, and analyzing the power spectral density comparison to estimate the assumed distortion, means for comparing the test data with reference data related to said particular relieved surface related to the authorized user, taking into account the estimated distortion, and means, responsive to the comparing means, for making an identity-verification decision; and nonvolatile memory means for holding instructions for automatic operation of the foregoing means.

21. A method for verifying the identity of a person by comparing test data representing a two-dimensional test image of that person's skin-pattern print with reference data derived from a two-dimensional reference skin-pattern print image obtained during a prior enrollment procedure; said method comprising the steps of:

correlating power spectral densities of corresponding regions of the test and reference images to determine relative isomorphic distortion between the images;

using a normalized spatial correlation value as a measure of similarity between corresponding regions of the test and reference images;

making an identity-verification decision based on said normalized spatial correlation value; and in nonvolatile memory, holding instructions for automatic operation of the above-mentioned steps.

22. The method of claim 21, further comprising the steps of:

operating a sensor to acquire the test data; and responsive to the decision-making step, operating a switch if identity is verified.

\* \* \* \* \*